(12) United States Patent
Jin et al.

(10) Patent No.: US 10,334,173 B2
(45) Date of Patent: Jun. 25, 2019

(54) ELECTRONIC DEVICE AND METHOD FOR EDITING IMAGE IN ELECTRONIC DEVICE

(71) Applicant: Samsung Electronics Co., Ltd., Suwon-si, Gyeonggi-do (KR)

(72) Inventors: Young-Tae Jin, Hwaseong-si (KR); So-Yeon Kim, Suwon-si (KR); Hyo-Jung Kim, Gumi-si (KR); Dae-Woong Song, Ansan-si (KR); Soo-Jung Lee, Seongnam-si (KR); Eo-Jin Lim, Suwon-si (KR); Seong-Yeon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/343,767

(22) Filed: Nov. 4, 2016

(65) Prior Publication Data

US 2017/0134663 A1    May 11, 2017

(30) Foreign Application Priority Data

Nov. 6, 2015    (KR) .................. 10-2015-0155950

(51) Int. Cl.
*H04N 5/232* (2006.01)
*H04N 1/00* (2006.01)
(Continued)

(52) U.S. Cl.
CPC ....... *H04N 5/23293* (2013.01); *G06T 11/001* (2013.01); *G06T 11/60* (2013.01);
(Continued)

(58) Field of Classification Search
CPC . G06F 2203/04104; G06F 2203/04808; G06F 3/044–047; G06F 2203/04111–04113; G06F 1/1643; G06F 1/169; G06F 1/1692; G06F 17/211; G06F 17/30056; G06F 3/03545; G06F 3/041;
(Continued)

(56) References Cited

U.S. PATENT DOCUMENTS 5,893,130 A   4/1999  Inoue et al.
6,970,175 B2  11/2005 Hawksworth
(Continued)

FOREIGN PATENT DOCUMENTS

EP    1 594 394     11/2005
JP    7-93507 A     4/1995
(Continued)

*Primary Examiner* — Xi Wang
(74) *Attorney, Agent, or Firm* — Jefferson IP Law, LLP

(57) ABSTRACT

An electronic device is provided. The electronic device includes a storage configured to store information about a plurality of color assignment areas included in an image editing tool displayed on a screen of the electronic device, a display configured to display the image editing tool including the plurality of color assignment areas on the screen of the electronic device, and a controller configured to run a preset application installed in the electronic device in response to an input related to color extraction, and display a color selected in at least one area of an execution screen of the application in the color assignment areas of the image editing tool.

10 Claims, 16 Drawing Sheets
(10 of 16 Drawing Sheet(s) Filed in Color)

(51) Int. Cl.
  *G06T 11/00*  (2006.01)
  *G06T 11/60*  (2006.01)

(52) U.S. Cl.
  CPC ..... *H04N 1/00411* (2013.01); *H04N 1/00453* (2013.01); *H04N 2201/0084* (2013.01); *H04N 2201/0096* (2013.01); *H04N 2201/0098* (2013.01)

(58) Field of Classification Search
  CPC .............. G06F 3/0416; H04N 9/74–76; H04N 1/00307
  USPC ........... 358/357; 381/118; 345/593; 382/110, 382/118; 434/100
  See application file for complete search history.

(56) References Cited

U.S. PATENT DOCUMENTS

| | | | |
|---|---|---|---|
| 8,081,193 B2 | 12/2011 | Jang et al. | |
| 2006/0098025 A1* | 5/2006 | Jang | G09G 5/02 345/594 |
| 2008/0089554 A1* | 4/2008 | Tabankin | G06T 1/0021 382/100 |
| 2008/0180533 A1 | 7/2008 | Craig et al. | |
| 2011/0298709 A1* | 12/2011 | Vaganov | G06F 3/03545 345/158 |
| 2012/0075329 A1* | 3/2012 | Skaff | G09G 5/06 345/593 |
| 2013/0022264 A1 | 1/2013 | Atsmon et al. | |
| 2013/0132905 A1 | 5/2013 | Moskalonek et al. | |
| 2013/0169827 A1* | 7/2013 | Santos | H04N 5/23229 348/207.1 |
| 2013/0326381 A1* | 12/2013 | Pereira | G06F 3/04845 715/765 |
| 2014/0210843 A1* | 7/2014 | VanCuren, Jr. | G06T 11/001 345/589 |
| 2015/0177975 A1* | 6/2015 | Lee | G06T 11/40 715/211 |
| 2015/0250294 A1* | 9/2015 | Miller | A45D 44/005 434/100 |

FOREIGN PATENT DOCUMENTS

| | | |
|---|---|---|
| JP | 4600783 B2 | 10/2010 |
| WO | 2004/073512 A1 | 9/2004 |
| WO | 2010/071617 A1 | 6/2010 |

\* cited by examiner

ELECTRONIC DEVICE AND METHOD FOR EDITING IMAGE IN ELECTRONIC DEVICE

CROSS-REFERENCE TO RELATED APPLICATION(S)

This application claims the benefit under 35 U.S.C. § 119(a) of a Korean patent application filed on Nov. 6, 2015 in the Korean Intellectual Property Office and assigned Serial number 10-2015-0155950, the entire disclosure of which is hereby incorporated by reference.

TECHNICAL FIELD

The present disclosure relates to an electronic device and a method for editing images in the electronic device. More particularly, the present disclosure relates to a method for effectively editing images by providing an image editing tool capable of extracting a color in association with at least one application on a screen of the electronic device.

BACKGROUND

Typically, an electronic device refers to a device that performs a specific function according to the program installed therein, such as home appliances, an electronic organizer, a portable multimedia player, a mobile communication terminal, a tablet personal computer (PC), an audio/video device, a desktop/laptop computer, and a car navigation device. For example, these electronic devices may output the stored information in audio or video. Owing to the increasing integration of the electronic devices and the generalization of the high-speed, high-capacity wireless communication, a variety of functions may be mounted in a single mobile communication terminal.

For example, not only the communication features, but also entertainment features, such as games, multimedia features, such as audio/video playback, communication/security features for mobile banking, and features for schedule management or electronic wallet may be concentrated in a single electronic device.

With the rapid spread of various electronic devices, the electronic devices have become the necessities indispensable to the moderns. These electronic devices have been equipped with more and more features, and the features of generating or editing images using the electronic devices have been developed in various ways. For example, by utilizing the editing features, users may read images stored in the electronic devices and resize the images to a desired size, or give a simple effect on the images.

According to the existing technology, when editing an image in an electronic device, the user should select a desired color from the preset color scheme, or enter a color by entering information related to the color. Even though there is a color that the user wants to extract while viewing a specific image or object, there is no effective way to extract the color.

Therefore, a need exists for an electronic device and a method for editing images in the electronic device, in which the electronic device may effectively edit images by providing an image editing tool capable of extracting a color in association with at least one application on a screen of the electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for editing images in the electronic device, in which the electronic device may effectively edit images by providing an image editing tool capable of extracting a color in association with at least one application on a screen of the electronic device.

Another aspect of the present disclosure is to provide an electronic device and a method for editing images in the electronic device, in which the electronic device may effectively edit images by providing an image editing tool capable of generating a variety of colors by mixing colors on a screen of the electronic device.

In accordance with an aspect of the present disclosure, an electronic device is provided. The electronic device includes a storage configured to store information about a plurality of color assignment areas included in an image editing tool displayed on a screen of the electronic device, a display configured to display the image editing tool including the plurality of color assignment areas on the screen of the electronic device, and a controller configured to run a preset application installed in the electronic device in response to an input related to color extraction, and display a color selected in at least one area of an execution screen of the application in the color assignment areas of the image editing tool.

In accordance with another aspect of the present disclosure, a method for editing an image in an electronic device is provided. The method includes displaying an image editing tool including a plurality of color assignment areas on a screen of the electronic device, running a preset application installed in the electronic device in response to an input related to color extraction, storing information about a color selected in at least one area of an execution screen of the application, and displaying the selected color in a color assignment area of the image editing tool.

In accordance with another aspect of the present disclosure, an electronic device is provided. The electronic device includes a storage configured to store information about a plurality of color assignment areas included in an image editing tool displayed on a screen of the electronic device, a display configured to display the image editing tool including the plurality of color assignment areas on the screen of the electronic device, and a controller configured to select a first color assigned to a first color assignment area and a second color assigned to a second color assignment area among the plurality of color assignment areas of the image editing tool, and display a third color generated by mixing the selected first and second colors in a preset mixing area of the image editing tool depending on an input of a user gesture corresponding to color mixing.

In accordance with another aspect of the present disclosure, a method for editing an image in an electronic device is provided. The method includes displaying an image editing tool including a plurality of color assignment areas and a color mixing area on a screen of the electronic device, selecting a first color assigned to a first color assignment area and a second color assigned to a second color assignment area among the plurality of color assignment areas of the image editing tool, and displaying a third color generated by mixing the selected first and second colors in the color mixing area of the image editing tool depending on an input of a user gesture corresponding to color mixing.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. As the color drawings are being filed electronically via EFS-Web, only one set of the drawings is submitted.

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
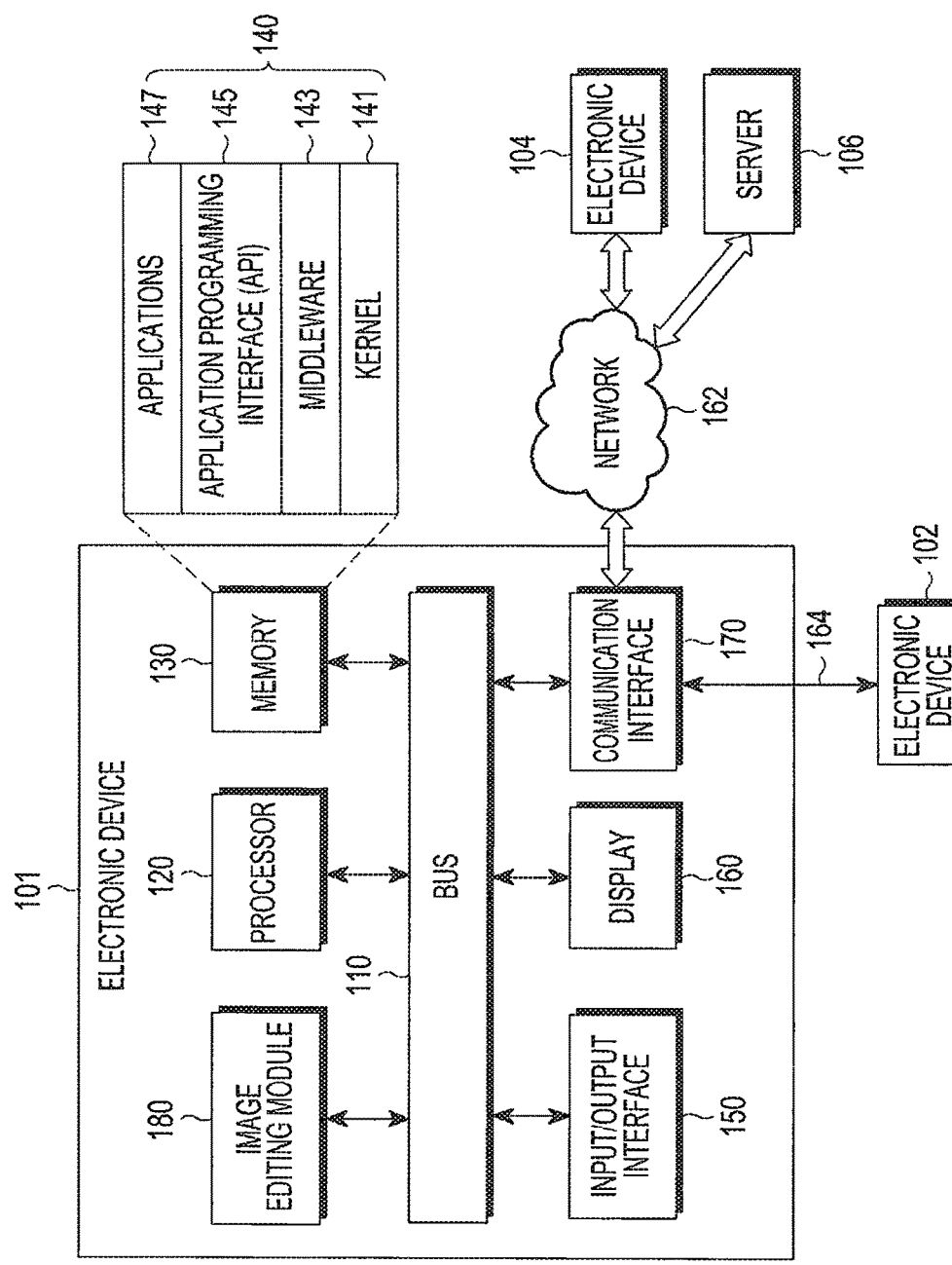
FIG. 1 illustrates an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an embodiment of the present disclosure, an expression, such as "having," "may have," "comprising," or "may comprise" indicates existence of a corresponding characteristic (such as an element, such as a numerical value, function, operation, or component) and does not exclude existence of additional characteristic.

In an embodiment of the present disclosure, an expression, such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions, such as "first," "second," "primarily," or "secondary," used in various embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it indicates that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a central processing unit (CPU) or an application processor) that can perform a corresponding operation by executing at least one software program stored at an exclusive processor (such as an embedded processor) for performing a corresponding operation or at a memory device.

Terms defined in the present disclosure are used for only describing a specific embodiment and may not have an intention to limit the scope of other embodiments. When using in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. It may be analyzed that terms defined in general dictionaries among terms used herein have the same meaning as or a meaning similar to that of a context of related technology and are not analyzed as an ideal or excessively formal meaning unless explicitly defined. In some case, terms defined in the present disclosure cannot be analyzed to exclude the present embodiments.

An electronic device according to various embodiments of the present disclosure may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture experts group (MPEG-1 or MPEG-2) audio layer-3 (MP3) player, a mobile medical device, a camera, or a wearable device (e.g., smart glasses, a head mounted device (HMD), electronic clothing, electronic bracelet, electronic necklace, electronic accessory (or appcessory), electronic tattoo, smart mirror, or smart watch).

In some embodiments of the present disclosure, the electronic device may be a smart home appliance. The smart home appliance may include at least one of, for example, a television (TV), a digital video disk (DVD) player, an audio player, a refrigerator, an air conditioner, a cleaner, an oven, a microwave oven, a washer, an air purifier, a set-top box, a home automation control panel, a security control panel, a TV box (e.g., a Samsung HomeSync™, an Apple TV™, or a Google TV™), a game console (e.g., Xbox™ or PlayStation™), an electronic dictionary, an electronic key, a camcorder or a digital photo frame.

In another embodiment of the present disclosure, the electronic device may include at least one of various medical devices (e.g., various portable medical meters (e.g., a blood glucose meter, a heart rate meter, a blood pressure meter, a temperature meter, and the like), magnetic resonance angiography (MRA), magnetic resonance imaging (MRI), computed tomography (CT), a medical camcorder, an ultrasonic device, and the like), a navigation device, a global positioning system (GPS) receiver, an event data recorder (EDR), a flight data recorder (FDR), an automotive infotainment device, a marine electronic device (e.g., a marine navigation device, a gyro compass, and the like), avionics, a security device, a car head unit, an industrial or household robot, an automatic teller's machine (ATM) for banks, point of sales (POS) for shops, or an Internet of things (IoT) device (e.g., an electric bulb, various sensors, an electricity or gas meter, a sprinkler device, a fire alarm, a thermostat, a streetlamp, a toaster, fitness equipment, a hot water tank, a heater, a boiler, and the like).

In some embodiments of the present disclosure, the electronic device may include at least one of a part of the furniture or building/structure, an electronic board, an electronic signature receiving device, a projector, or various meters (e.g., meters for water, electricity, gas or radio waves). In various embodiments of the present disclosure, the electronic device may be one or a combination of the above-described devices. An electronic device according to some embodiments may be a flexible electronic device. Further, an electronic device according to an embodiment of the present disclosure will not be limited to the above-described devices, and may include a new electronic device provided by the development of technology.

An aspect of various embodiments of the present disclosure is to provide an electronic device and a method for editing images in the electronic device, in which the electronic device may effectively edit images by providing an image editing tool capable of extracting or mixing colors in association with various applications on a screen of the electronic device.

In various embodiments of the present disclosure, the term 'image editing tool' may refer to an image editing unit that is displayed on the screen according to an operation of an application running in the electronic device. The image editing tool may be displayed in various forms. For example, although the image editing tool will be displayed as a palette image in various embodiments of the present disclosure, the present disclosure is not limited to the form of image.

An electronic device according to various embodiments of the present disclosure will be described below with reference to the accompanying drawings. As used herein, the term 'user' may refer to a person who uses the electronic device, or a device (e.g., an intelligent electronic device) that uses the electronic device.

FIG. 1 illustrates an electronic device in a network environment according to various embodiments of the present disclosure.

Referring to FIG. 1, an electronic device 101 may include at least one of a bus 110, a processor 120, a memory 130, an input/output (I/O) interface 150, a display 160, a communication interface 170 or an image editing module 180. In certain embodiments of the present disclosure, the electronic device 101 may omit at least one of the components, or may additionally include other components.

The bus 110 may include, for example, a circuit that connects the components 110 to 180 to each other, and transfers the communication (e.g., a control message and/or data) between the components 110 to 180.

The processor 120 may include one or more of a CPU, an application processor (AP) or a communication processor (CP). The processor 120 may, for example, execute a control and/or communication-related operation or data processing for at least one other component of the electronic device 101.

The memory 130 may include a volatile and/or non-volatile memory. The memory 130 may, for example, store a command or data related to at least one other component of the electronic device 101. In an embodiment of the present disclosure, the memory 130 may store software and/or a program 140. The program 140 may include, for example, a kernel 141, a middleware 143, an application programming interface (API) 145, and/or an application program (or 'application') 147. At least some of the kernel 141, the middleware 143 or the API 145 may be referred to as an operating system (OS).

The kernel 141 may, for example, control or manage the system resources (e.g., the bus 110, the processor 120, the memory 130, and the like) that are used to execute the operation or function implemented in other programs (e.g., the middleware 143, the API 145, the application program 147, and the like). Further, the kernel 141 may provide an interface by which the middleware 143, the API 145 or the application program 147 can control or manage the system resources by accessing the individual components of the electronic device 101.

The middleware 143 may, for example, perform an intermediary role so that the API 145 or the application program 147 may exchange data with the kernel 141 by communicating with the kernel 141. Further, the middleware 143 may process one or more work requests received from the application program 147 according to their priority. For example, the middleware 143 may give priority capable of using the system resources (e.g., the bus 110, the processor 120, the memory 130, and the like) of the electronic device 101, to at least one of the application programs 147. For example, the middleware 143 may process the one or more work requests according to the priority given to at least one of the application programs 147, thereby performing scheduling or load balancing for the one or more work requests.

The API 145, for example, is an interface by which the application program 147 controls the function provided in the kernel 141 or the middleware 143, and may include at least one interface or function (e.g., a command) for, for example, file control, window control, image processing or character control.

The I/O interface 150 may, for example, serve as an interface that can transfer a command or data received from the user or other external device to the other components of the electronic device 101. Further, the I/O interface 150 may output a command or data received from the other components of the electronic device 101, to the user or other external devices.

The display 160 may include, for example, a liquid crystal display (LCD) display, a light emitting diode (LED) display, an organic light emitting diode (OLED) display, a microelectromechanical systems (MEMS) display or an electronic paper display, as a device capable of displaying an image editing module (e.g., a palette image) according to various embodiments of the present disclosure. The display 160 may, for example, display a variety of content (e.g., texts, images, videos, icons, symbols, and the like), for the user. The display 160 may include a touch screen, and may receive a touch input, a gesture input, a proximity input or a hovering input made by, for example, an electronic pen or a part of the user's body.

The communication interface 170 may, for example, establish communication between the electronic device 101 and an external device (e.g., a first external electronic device 102, a second external electronic device 104 or a server 106). For example, the communication interface 170 may communicate with the external device (e.g., the second external electronic device 104 or the server 106) by being connected to a network 162 through wireless communication or wired communication. Further, the wireless communication may include, e.g., short-range communication 164. The communication interface 170 may, for example, directly communicate with the external device (e.g., the first external electronic device 102) through wireless communication or wired communication. In the embodiments described below, if the electronic device 101 is a smart phone, the first external electronic device 102 may be a wearable device.

The wireless communication may include at least one of, for example, long term evolution (LTE), long term evolution-advanced (LTE-A), code division multiple access (CDMA), wideband code division multiple access (WCDMA), universal mobile telecommunication system (UNITS), wireless broadband (WiBro) or global system for mobile communication (GSM), as a cellular communication protocol. The wired communication may include at least one of, for example, universal serial bus (USB), high definition multimedia interface (HDMI), recommended standard 232 (RS-232) or plain old telephone service (POTS). The network 162 may include a telecommunications network, for example, at least one of the computer network (e.g., a local area network (LAN) or a wide area network (WAN)), the Internet, or the telephone network.

Each of the first external electronic device 102 and the second external electronic device 104 may be a device that is the same as or different from the electronic device 101 in type. In an embodiment of the present disclosure, the server 106 may include a group of one or more servers. In various embodiments of the present disclosure, all or some of the operations executed in the electronic device 101 may be executed in one or multiple other electronic devices (e.g., the first external electronic device 102 and the second external electronic device 104 or the server 106). In an embodiment of the present disclosure, if the electronic device 101 should perform a certain function or service automatically or upon request, the electronic device 101 may request at least some of the functions related thereto from other electronic devices (e.g., the first external electronic device 102 and the second external electronic device 104 or the server 106), instead of or in addition to spontaneously executing the function or service. The other electronic devices (e.g., the first external electronic device 102 and the second external electronic device 104 or the server 106) may execute the requested function or additional function, and transfer the results to the electronic device 101. The electronic device 101 may process the received results intact or additionally, thereby providing the requested function or service. To this end, for example, the cloud computing, distributed computing, or client-server computing technology may be used.

Although the electronic device 101 includes the communication interface 170 to communicate with the second external electronic device 104 or the server 106 over the network 162 as shown in FIG. 1, the electronic device 101 may be implemented to operate independently without a separate communication function according to various embodiments of the present disclosure.

In an embodiment of the present disclosure, the server 106 may perform at least one operation (or function) among the operations (or functions) implemented in the electronic device 101, to support operation of the electronic device 101. For example, the server 106 may include an image editing server module (not shown) capable of supporting the image editing module 180 implemented in the electronic device 101. For example, the image editing server module may include at least one component of the image editing module 180, to perform (or execute) at least one of the operations (or functions) performed by the image editing module 180. Further, according to various embodiments of the present disclosure, the server 106 may be an image editing feature-providing server capable of providing a variety of image editing-related features to the electronic device 101.

The image editing module 180 may process at least some of the information obtained from other components (e.g., the processor 120, the memory 130, the I/O interface 150, the communication interface 170, and the like), and provide the processed information to the user in various ways.

For example, the image editing module 180 may perform a function of loading from the memory 130 at least one image editing application capable of editing images according to various embodiments of the present disclosure, generating an image editing tool (e.g., a palette image) depending on execution of the image editing application, and outputting the generated image editing tool on the display 160 or transmitting the generated image editing tool to the other electronic devices (e.g., the first external electronic device 102 and the second external electronic device 104 or the server 106) via the communication interface 170. Further, the image editing module 180 may provide a function of extracting a color or mixing a plurality of selected colors in association (or interworking) with other applications using the image editing tool according to various embodiments of the present disclosure. Additional information about the image editing module 180 may be provided through FIG. 2.

Although the image editing module 180 is shown as a module separate from the processor 120 in FIG. 1, at least a part of the image editing module 180 may be implemented in the processor 120 or at least one other module, and the entire function of the image editing module 180 may be implemented in the processor 120 or other processors.

Figure 2:
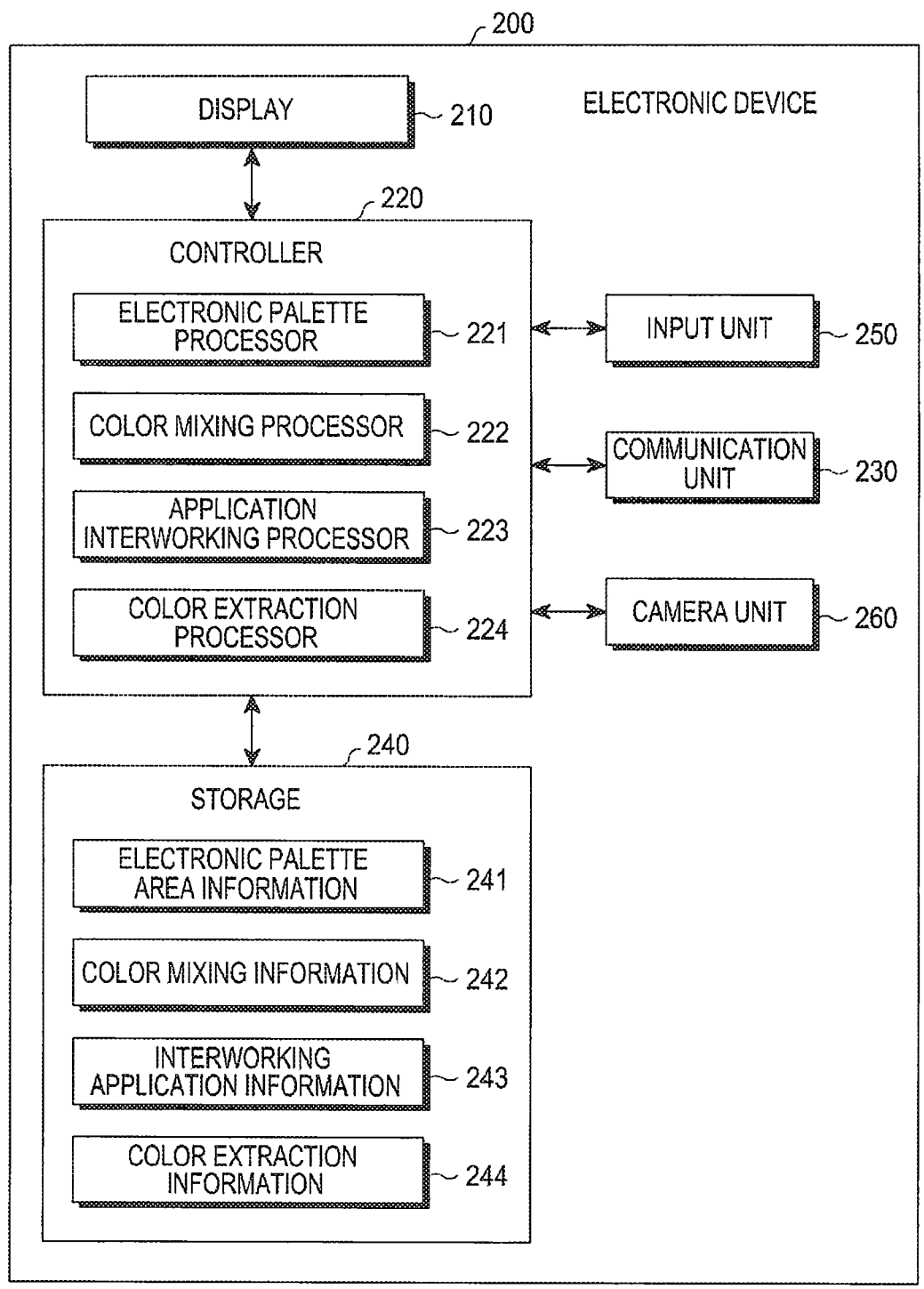
FIG. 2 illustrates a configuration of an electronic device according to an embodiment of the present disclosure.

FIG. 2 illustrates a configuration of an electronic device according to an embodiment of the present disclosure.

Referring to FIG. 2, according to various embodiments of the present disclosure, an electronic device 200 may include at least one of a display 210, a controller 220, a communication unit 230, a storage 240, an input unit 250, and a camera unit 260. Further, according to various embodiments of the present disclosure, the controller 220 may include at least one of an electronic palette processor 221, a color mixing processor 222, an application interworking processor 223, and a color extraction processor 224.

For the components of the electronic device 200 in FIG. 2, all or some of their functions may be included in at least one of the elements in FIG. 1. For example, at least a portion of the controller 220 may be included in the image editing module 180 or the processor 120 in FIG. 1. Further, at least a portion of the storage 240 may be included in the memory 130 in FIG. 1, at least a portion of the display 210 may be included in the display 160 in FIG. 1, and at least a portion of the communication unit 230 may be included in the communication interface 170 in FIG. 1.

The storage 240 may include (or store) electronic palette area information 241, color mixing information 242, interworking application information 243, or color extraction information 244. The information stored in the storage 240 may be provided from external electronic devices (i.e., a server or other electronic devices) of the electronic device 200. Further, the storage 240 may further store a variety of information related to image editing.

The electronic palette processor 221 may control to identify the electronic palette area information 241 (e.g., information about at least one color assignment area, empty area information, application interworking area information, mixing area information, and the like) in the storage 240 depending on execution of an image editing application, and display an image editing tool (e.g., an electronic palette) including at least one color assignment area, on the display 210.

The color mixing processor 222 may control to calculate a mixed color for at least two selected colors upon receiving, through the input unit 250, a user input (e.g., a user gesture) corresponding to mixing for at least two colors selected on an electronic palette generated by the electronic palette processor 221, and display the calculated color in a preset mixing area of the electronic palette.

In the application interworking processor 223, if a user input corresponding to execution of a preset application is made for color extraction on the electronic palette generated by the electronic palette processor 221, the preset application may be run in association (or interworking) with the image editing application. The preset application may be, for example, a camera application, a Gallery application, and the like. In response to an execution command for the camera application, the camera unit 260 may be controlled to receive an image currently being captured. An embodiment thereof will be described below.

The color extraction processor 224 may control to, if a user input corresponding to color extraction is received through the input unit 250 from an application that is run in association with the image editing application by the application interworking processor 223, extract a color selected in at least one area of an execution screen of the application and display the extracted color in a color assignment area on the electronic palette.

Figure 5:
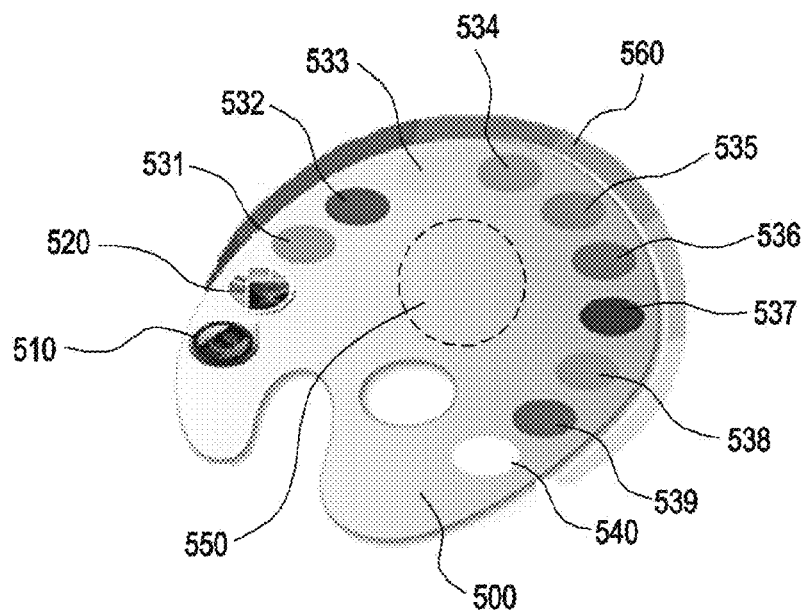
FIG. 5 illustrates areas of an electronic palette according to various embodiments of the present disclosure.

The storage 240 may store at least one of the electronic palette area information 241, the color mixing information 242, the interworking application information 243, and the color extraction information 244. The electronic palette area information 241, as described above, may include information about at least one area included in the electronic palette. For example, the at least one area included in the electronic palette may include a color assignment area, an application interworking area, a color mixing area and a saturation adjustment area as shown in FIG. 5.

The color mixing information 242, as described above, may include information for mixing two or more colors selected in response to a user's input corresponding to color mixing. For example, the color mixing information 242 may include color code information that can be generated at a mixing ratio for each color. A description thereof will be provided below.

The interworking application information 243 may include information about at least one application that is to be run in association with the image editing application, for a function of color extraction after execution of the image editing application. For example, the application to be run in association with the image editing application may include a camera application, a Gallery application, and the like.

The color extraction information 244, as described above, may store (or include) information about a color that is extracted from the run application depending on the execution of the interworking application.

According to various embodiments of the present disclosure, the controller 220 may perform computation of the electronic device 200, and may further process various functions for controlling the operation of the electronic device 200. For example, the controller 220 may be an AP, or may be a separate processor designed to consume low power. Otherwise, the controller 220 may be configured to be included in a modem processor, or may be included in a processor of a separate communication module or a positioning module.

The communication unit 230 may be a device that communicates with electronic devices or a server other than the electronic device 200 wirelessly or by wire. The other electronic device may be another mobile device, or may be a fixed access point (AP) or Bluetooth low energy (BLE) beacon. Otherwise, the other electronic device may be a base station in the mobile communication network.

In various embodiments of the present disclosure, the term 'function' or 'module' may refer to a functional or mechanical combination of hardware for carrying out the technical ideas of various embodiments of the present disclosure and software for driving the hardware. For example, the function or the module may mean a logical unit of a certain code and hardware resources for execution of the certain code. However, it may be readily understood by those skilled in the art that the function or the module does not necessarily mean a physically connected code or one type of hardware.

An electronic device according to any one of various embodiments of the present disclosure may include a storage configured to store information about a plurality of color assignment areas included in an image editing tool displayed on a screen of the electronic device, a display configured to display the image editing tool including the plurality of color assignment areas on the screen of the electronic device, and a controller configured to run a preset application installed in the electronic device in response to an input related to color extraction, and display a color selected in at least one area of an execution screen of the application in the color assignment areas of the image editing tool.

According to various embodiments of the present disclosure, the image editing tool may be displayed in the form of a palette.

According to various embodiments of the present disclosure, the preset application may include a camera-related application.

According to various embodiments of the present disclosure, the selected color may be a color corresponding to a selected area or pixel of an image that is captured by a camera depending on execution of the camera-related application.

According to various embodiments of the present disclosure, the selected color may be a color corresponding to a selected area or pixel of a preview image that is captured by a camera depending on execution of the camera-related application.

According to various embodiments of the present disclosure, the preset application may include a Gallery application capable of reading a plurality of images stored in the electronic device.

According to various embodiments of the present disclosure, the selected color may be a color corresponding to an area or pixel selected in at least one image that is displayed on a screen depending on execution of the Gallery application.

An electronic device according to any one of various embodiments of the present disclosure may include a storage configured to store information about a plurality of color assignment areas included in an image editing tool displayed on a screen of the electronic device, a display configured to display the image editing tool including the plurality of color assignment areas on the screen of the electronic device, and a controller configured to select a first color assigned to a first color assignment area and a second color assigned to a second color assignment area among the plurality of color assignment areas of the image editing tool, and display a third color generated by mixing the selected first and second colors in a preset mixing area of the image editing tool depending on an input of a user gesture corresponding to color mixing.

According to various embodiments of the present disclosure, the image editing tool may be displayed in the form of a palette.

According to various embodiments of the present disclosure, the controller may determine a mixing ratio of color based on a selection time of the selected color.

According to various embodiments of the present disclosure, the controller may determine a mixing ratio of color based on a touch pressure of the selected color.

Figure 3:
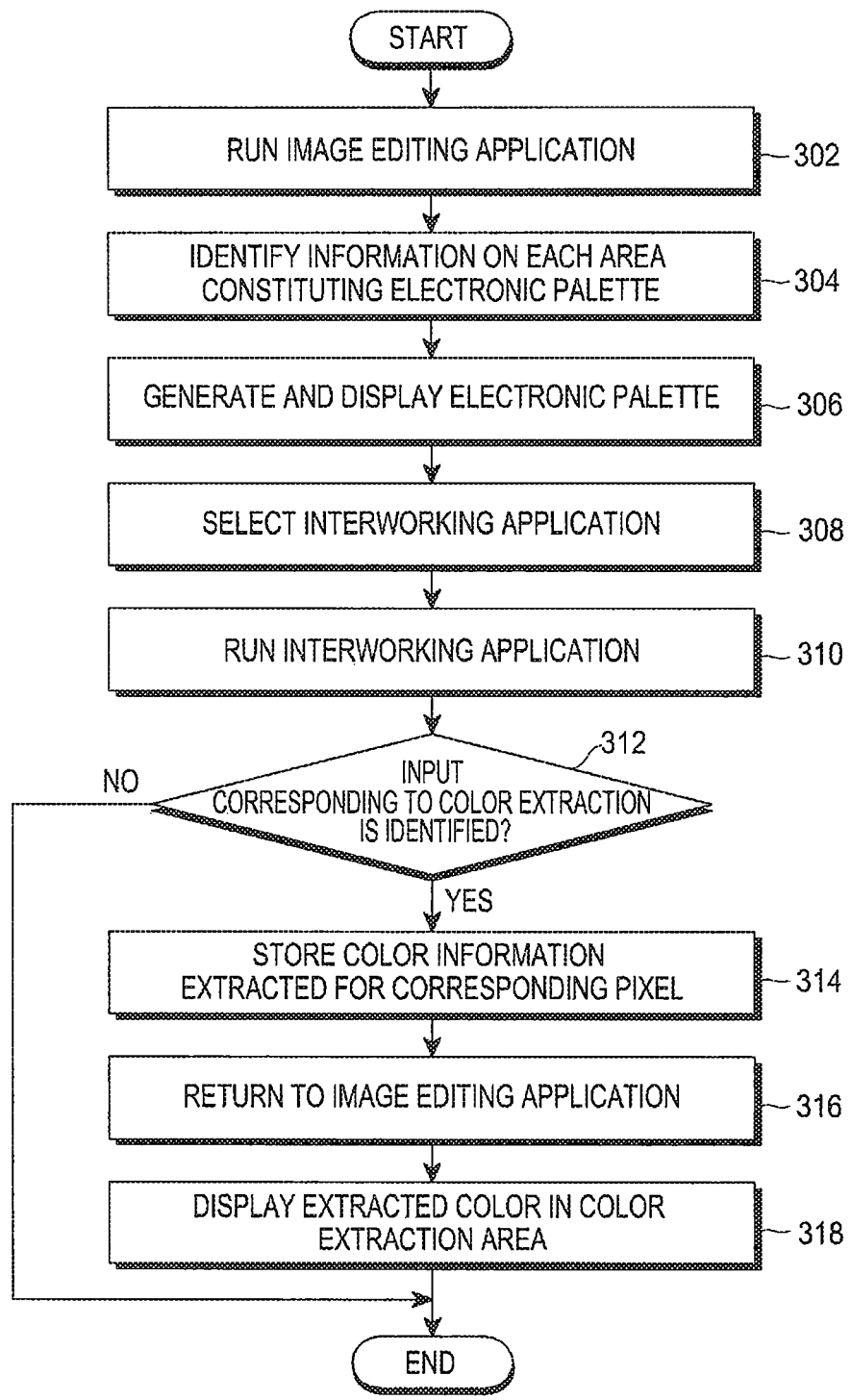
FIG. 3 is a flowchart illustrating a procedure for extracting a color in an electronic device according to various embodiments of the present disclosure.

FIG. 3 is a flowchart illustrating a procedure for extracting a color in an electronic device according to various embodiments of the present disclosure.

Referring to FIG. 3, if the controller runs an image editing application in operation 302, the controller may identify information about each area constituting an image editing tool (e.g., an electronic palette) stored in the storage in operation 304. In operation 306, the controller may generate an electronic palette based on the identified area-specific information and display the generated electronic palette on the screen.

According to various embodiments of the present disclosure, if the controller selects a preset at least one application interworking with the image editing application in operation 308, the interworking application (e.g., a camera application, a Gallery application, and the like) may be run in association with the image editing application in operation 310.

If a user input corresponding to color extraction is identified in the run interworking application in operation 312, the controller may store a color corresponding to the corresponding area (e.g., a pixel on a screen image) on the screen corresponding to the user input, in the storage as an extracted color in operation 314.

The extracted color information may be stored (e.g., temporarily stored), and the controller may return to the image editing application in operation 316. In operation 318, the controller may display the extracted color in a preset color extraction area of the image editing tool (e.g., the electronic palette) that is displayed depending on execution of the image editing application.

Figure 4:
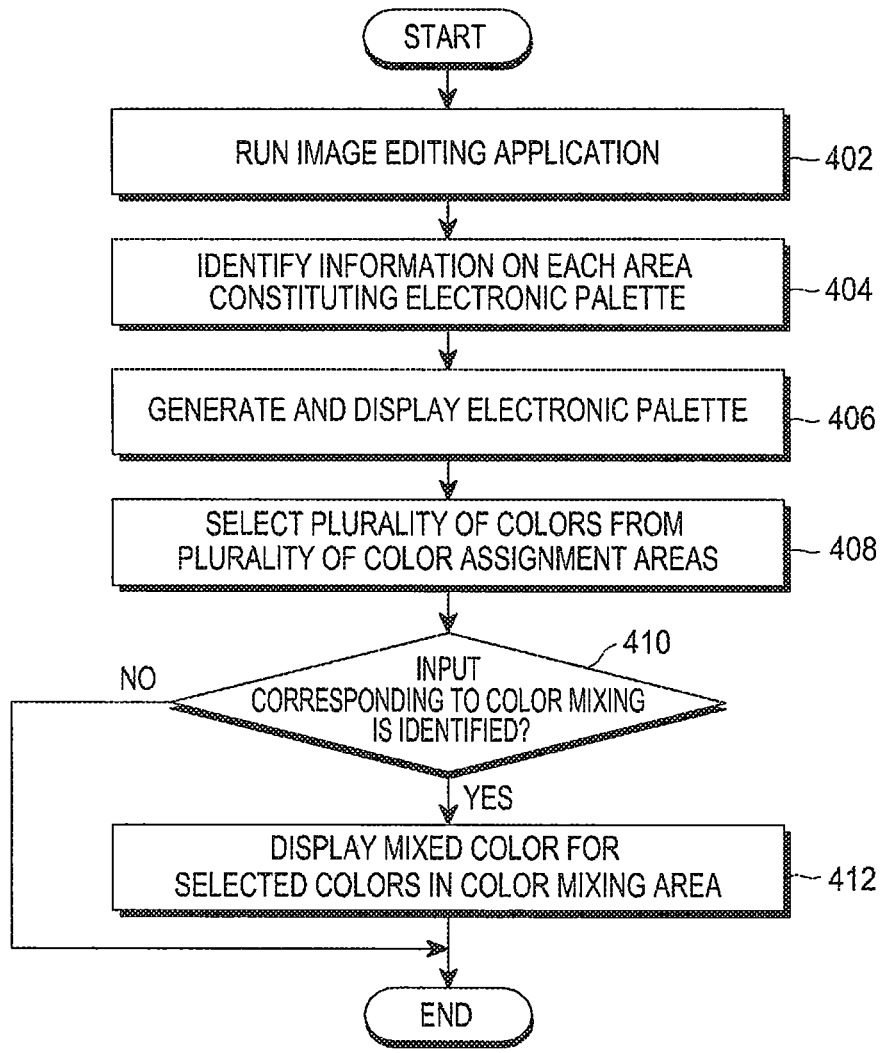
FIG. 4 is a flowchart illustrating a procedure for mixing colors in an electronic device according to various embodiments of the present disclosure.

FIG. 4 is a flowchart illustrating a procedure for mixing colors in an electronic device according to various embodiments of the present disclosure.

Referring to FIG. 4, if the controller runs an image editing application in operation 402, the controller may identify information about each area constituting an image editing tool (e.g., an electronic palette) stored in the storage in operation 404. In operation 406, the controller may generate an electronic palette based on the identified area-specific information and display the generated electronic palette on the screen.

According to various embodiments of the present disclosure, the controller may select a plurality of colors from a plurality of color assignment areas in operation 408. If an input corresponding to color mixing for the plurality of selected colors is identified in operation 410, the controller may determine a mixed color for the plurality of selected colors and display the determined mixed color in a color mixing area on the image editing tool in operation 412.

According to various embodiments of the present disclosure, at least one of the operations shown in FIG. 3 or 4 may be omitted, and at least one other operation may be added between the operations. Further, the operations in FIG. 3 or 4 may be processed in the shown order, and the execution order of at least one operation may be changed with the execution order of the other operation. Besides, the operations shown in FIG. 3 or 4 may be performed in the electronic device, or in the server. Further, at least one of the operations shown in FIG. 3 or 4 may be performed in the electronic device, and the other operations may be implemented to be performed in the server.

As for an operation method of an electronic device according to any one of various embodiments of the present disclosure, a method for editing an image in an electronic device may include displaying an image editing tool including a plurality of color assignment areas on a screen of the electronic device, running a preset application installed in the electronic device in response to an input related to color extraction, storing information about a color selected in at least one area of an execution screen of the application, and displaying the selected color in a color assignment area of the image editing tool.

According to various embodiments of the present disclosure, the image editing tool may be displayed in the form of a palette.

According to various embodiments of the present disclosure, the preset application may include a camera-related application.

According to various embodiments of the present disclosure, the selected color may be a color corresponding to a selected area or pixel of an image that is captured by a camera depending on execution of the camera-related application.

According to various embodiments of the present disclosure, the selected color may be a color corresponding to a selected area or pixel of a preview image that is captured by a camera depending on execution of the camera-related application.

According to various embodiments of the present disclosure, the preset application may include a Gallery application capable of reading a plurality of images stored in the electronic device.

According to various embodiments of the present disclosure, the selected color may be a color corresponding to an area or pixel selected in at least one image that is displayed on a screen depending on execution of the Gallery application.

As for an operation method of an electronic device according to any one of various embodiments of the present disclosure, a method for editing an image in an electronic device may include displaying an image editing tool including a plurality of color assignment areas and a color mixing area on a screen of the electronic device, selecting a first color assigned to a first color assignment area and a second color assigned to a second color assignment area among the plurality of color assignment areas of the image editing tool, and displaying a third color generated by mixing the selected first and second colors in the color mixing area of the image editing tool depending on an input of a user gesture corresponding to color mixing.

According to various embodiments of the present disclosure, the image editing tool may be displayed in the form of a palette.

According to various embodiments of the present disclosure, the method may further include determining a mixing ratio of color based on a selection time of the selected color.

According to various embodiments of the present disclosure, the method may further include determining a mixing ratio of color based on a touch pressure of the selected color.

FIG. 5 illustrates areas of an electronic palette according to various embodiments of the present disclosure.

Referring to FIG. 5, an image editing tool according to various embodiments of the present disclosure may be implemented as a palette image 500 as shown in the drawing. However, various embodiments of the present disclosure will not be limited to the shown form of image. For example, the image editing tool according to various embodiments of the present disclosure may be configured in various types of image capable of including at least one color assignment area.

According to various embodiments of the present disclosure, the palette image 500 may include at least one color assignment areas 531, 532, 533, 534, 535, 536, 537, 538, 539, and 540. A color assigned to the color assignment area may be set in advance, or may be set by the user.

Further, the palette image 500 may include at least one interworking application areas 510 and 520. For example, the interworking application areas may include a camera application area 510, a Gallery application area 520, and the like.

Further, the palette image 500 may include a color mixing area 550 in a specific area (e.g., the central area) other than the color assignment areas. According to various embodiments of the present disclosure, if the user brings a plurality of colors in the color mixing area 550 to mix the colors, the electronic device may determine and display the mixed color.

Further, the palette image 500 may further include a saturation spectrum area 560 on its edge. For example, if the user selects any one color displayed in the color assignment areas 531, 532, 533, 534, 535, 536, 537, 538, 539 and 540, the electronic device may display a saturation spectrum for the selected color in the saturation spectrum area 560. By selecting any one of the colors displayed in the saturation spectrum area 560, the user may select a color of various saturations that are based on the selected color.

Figure 6:
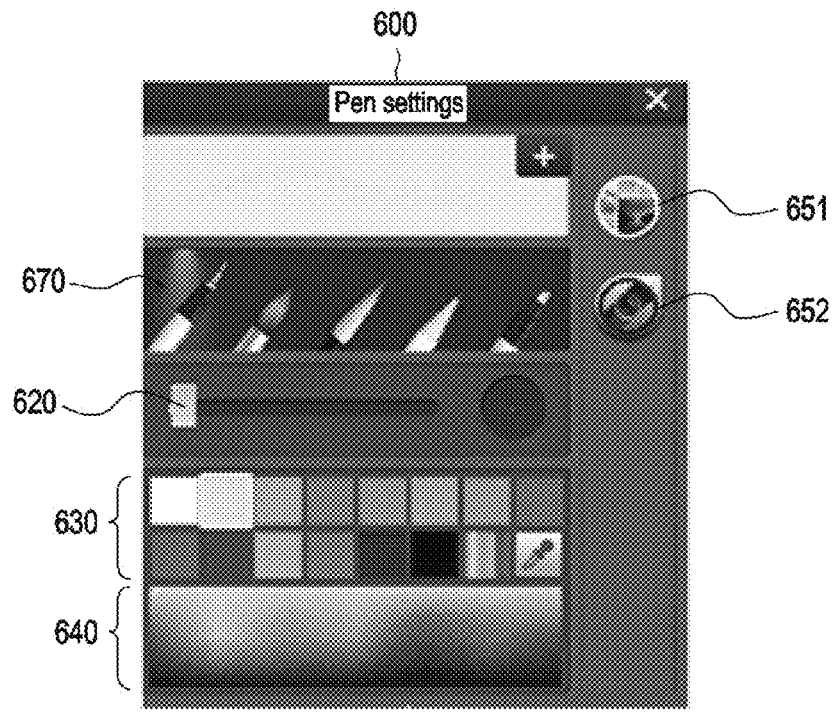
FIG. 6 illustrates a pen setting tool according to various embodiments of the present disclosure.

FIG. 6 illustrates a pen setting tool according to various embodiments of the present disclosure.

Referring to FIG. 6, if the user selects a specific area in the palette image shown in FIG. 5 or executes a function set on a specific menu, the electronic device may display a pen setting tool 600 as shown in the drawing. The pen setting tool 600 may include a pen selection area 670 capable of selecting various types of pens, a thickness setting slide 620 capable of setting the thickness of each pen, a color selection area 630, a color spectrum area 640, and interworking application areas 651 and 652.

Figure 7:
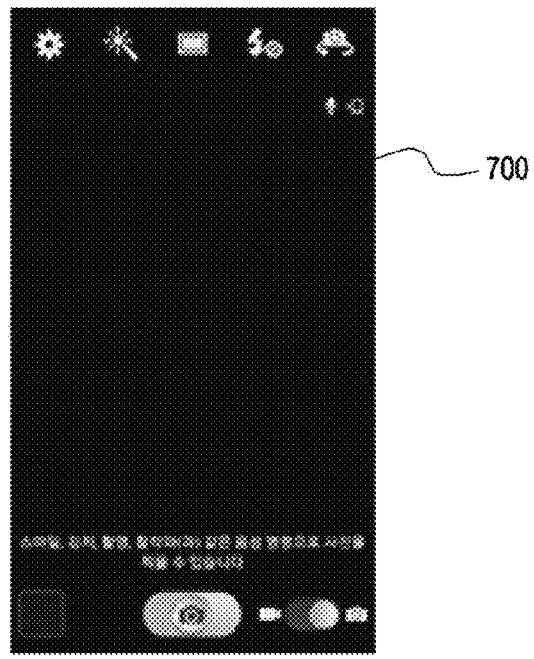
FIG. 7 illustrates an execution screen of a camera application interworking with an electronic palette according to various embodiments of the present disclosure.
Figure 8:
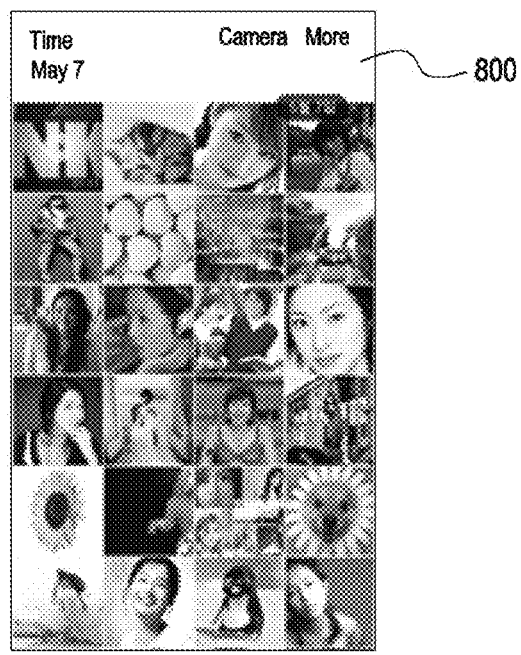
FIG. 8 illustrates an execution screen of a Gallery application interworking with an electronic palette according to various embodiments of the present disclosure.

If the user selects an interworking application area on the screen of the palette image 500 or the pen setting tool 600 shown in FIG. 5 or 6, the corresponding interworking applications may be run as shown in FIGS. 7 and 8.

FIG. 7 illustrates an execution screen of a camera application interworking with an electronic palette according to various embodiments of the present disclosure.

Referring to FIG. 7, if the user selects a camera application as an interworking application in FIG. 5 or 6, the selected camera application 700 may be run. The user, as in the following description, may select a specific area (or a specific pixel) of an image (e.g., a captured image or a preview image) currently being displayed in the run camera application 700, to extract a color corresponding to the selected area (or pixel). If the color extraction operation is completed, the camera application may be terminated and the electronic device may return back to the image editing application. Further, if the electronic device returns to the image editing application, the extracted color may be displayed in a color extraction area on the image editing tool of the image editing application.

FIG. 8 illustrates an execution screen of a Gallery application interworking with an electronic palette according to various embodiments of the present disclosure.

Referring to FIG. 8, if the user selects a Gallery application as an interworking application in FIG. 5 or 6, a selected Gallery application 800 may be run. The user, as in the following description, may select a specific area (or a specific pixel) of an image currently being displayed in the run Gallery application 800, to extract a color corresponding to the selected area (or pixel). If the color extraction operation is completed, the Gallery application may be terminated and the electronic device may return back to the image editing application. Further, if the electronic device returns to the image editing application, the extracted color may be displayed in a color extraction area on the image editing tool of the image editing application.

Figure 9:
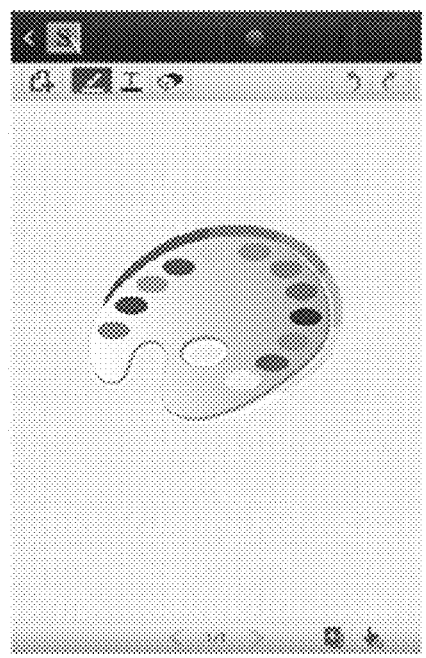
FIG. 9 illustrates an execution screen of an electronic palette according to various embodiments of the present disclosure.

FIG. 9 illustrates an execution screen of an electronic palette according to various embodiments of the present disclosure.

Referring to FIG. 9, the above-described image editing tool (e.g., the palette image) may be run in association with another application (e.g., S Note) installed in the electronic device, and may be displayed in a separate dedicated image editing application.

The palette image may move as shown in FIGS. 10 and 11, and may be transformed into various forms depending on various modes.

Figure 10A:
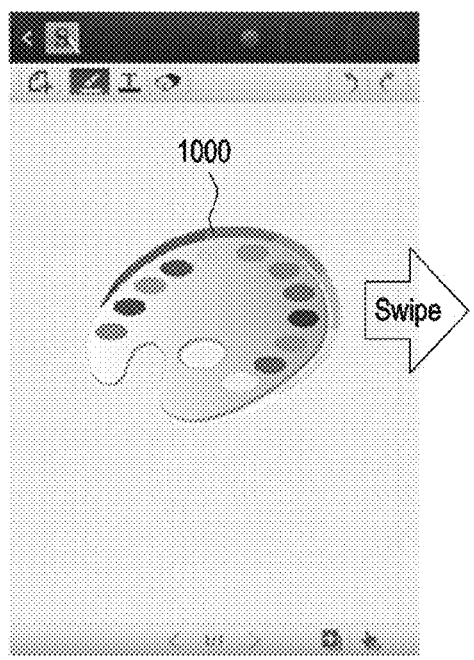
FIGS. 10A and 10B illustrate a method of switching a display mode by moving an electronic palette to a side of a screen according to various embodiments of the present disclosure.
Figure 10B:
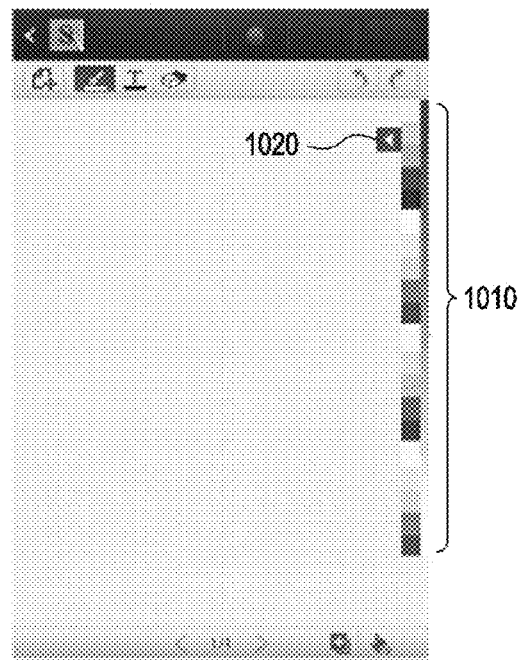

FIGS. 10A and 10B illustrate a method of switching a display mode by moving an electronic palette to a side of a screen according to various embodiments of the present disclosure.

Referring to FIGS. 10A and 10B, if the user, as shown in FIG. 10A, touches-and-drags or swipes left or right a palette image 1000 that is being displayed on an image editing application in a virtual mode, the palette image 1000 may be fixed to a left or right area 1010 and displayed as shown in FIG. 10B.

If the user selects a preset button 1020 while the image editing tool is fixed to the right area as shown in FIG. 10B, the palette image may be switched back to the virtual mode and displayed as shown in FIG. 10A.

Figure 11A:
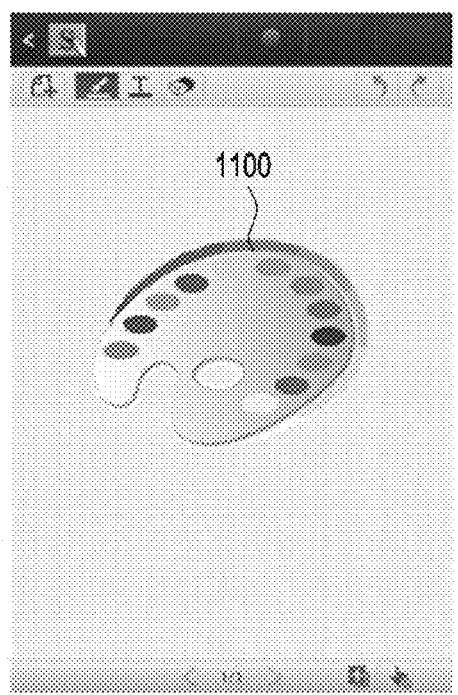
FIGS. 11A to 11C illustrate a method of switching a display mode by moving an electronic palette to a bottom of a screen according to various embodiments of the present disclosure.
Figure 11B:
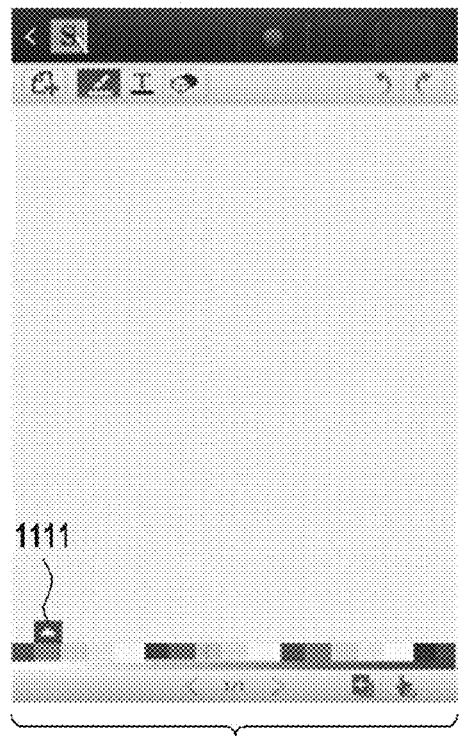
Figure 11C:
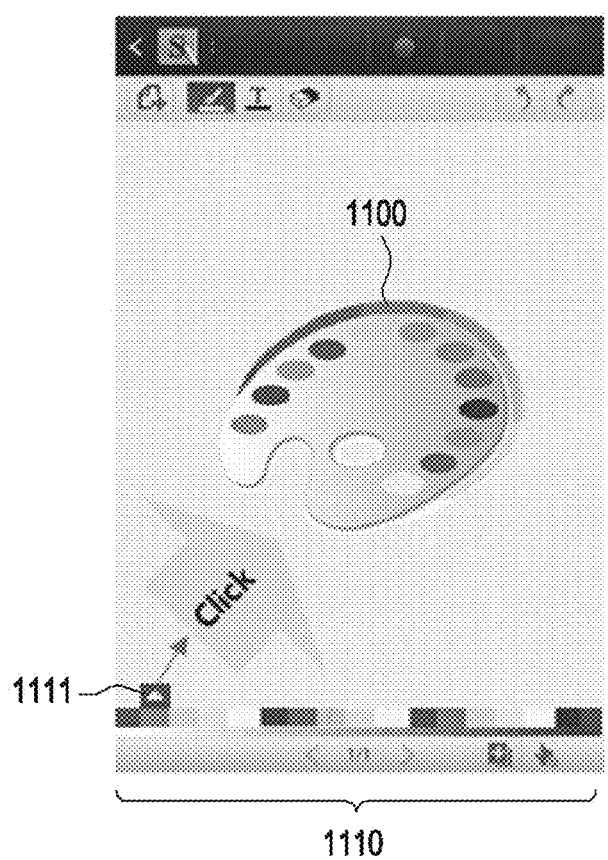

FIGS. 11A to 11C illustrate a method of switching a display mode by moving an electronic palette to a bottom of a screen according to various embodiments of the present disclosure.

Referring to FIGS. 11A to 11C, if the user, as shown in FIG. 11A, touches-and-drags or swipes, to the bottom, a palette image 1100 that is being displayed on the image editing application, the palette image 1100 may be fixed to the bottom area 1110 and displayed as shown in FIG. 11B. According to various embodiments of the present disclosure, in the bottom area 1110, the colors assigned to the color assignment areas may be displayed in the form of a straight line, and a saturation spectrum for a selected specific color may also be displayed together.

If the user, as shown in FIG. 11B, selects a preset button 1111 while the image editing tool is fixed to the bottom area, the palette image 1100 may be displayed back in the virtual mode as shown in FIG. 11C.

FIGS. 12A to 12D illustrate a method of extracting a color through a Gallery application interworking with an electronic palette according to various embodiments of the present disclosure.

Figure 12A:
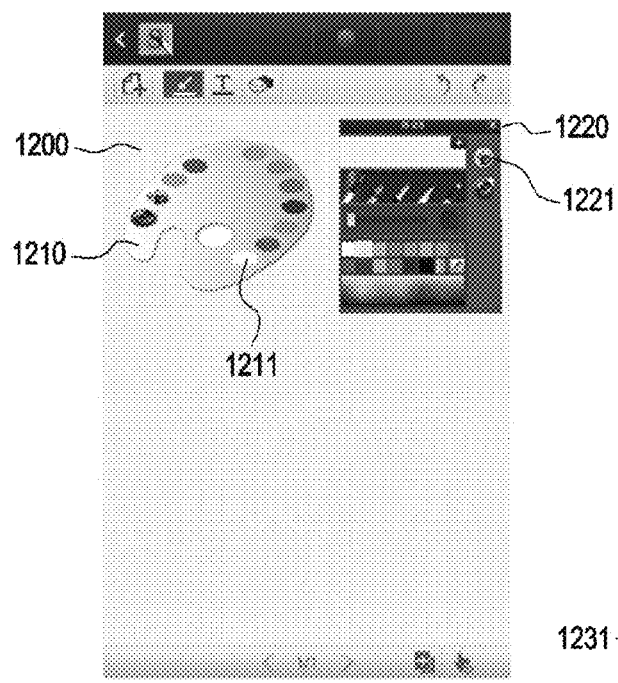
FIGS. 12A to 12D illustrate a method of extracting a color through a Gallery application interworking with an electronic palette according to various embodiments of the present disclosure.

Referring to FIG. 12A, if an image editing application 1200 is run, a palette image 1210 including at least one color assignment area 1211 may be displayed. Further, a pen setting tool 1220 may be displayed together with the palette image 1210.

If a preset interworking application is selected in the pen setting tool 1220 or the palette image 1210, for color extraction, the interworking application may be run in association with the image editing application.

Figure 12B:

Referring to FIG. 12B, for example, if the user selects a Gallery application 1221, the Gallery application may be run, and a plurality of thumbnail images 1231 stored in the Gallery may be displayed.

Figure 12C:
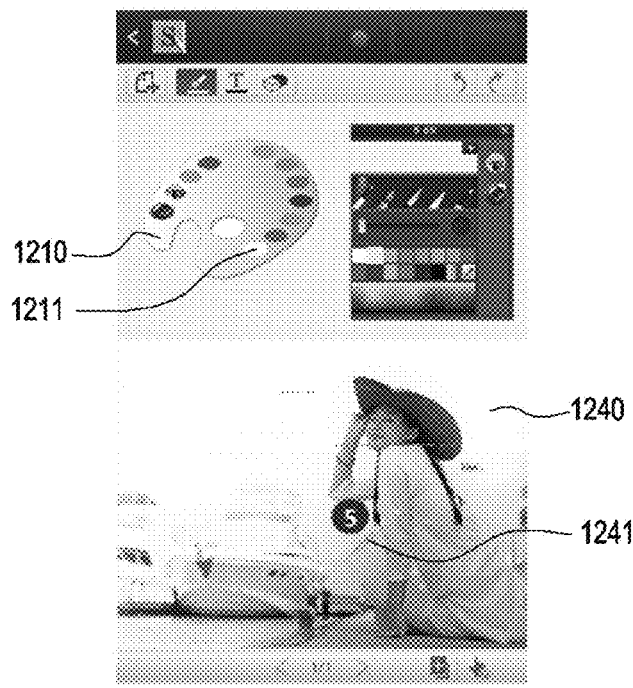

Referring to FIG. 12C, if a specific thumbnail image 1231 is selected in FIG. 12B, an image corresponding to the selected thumbnail image may be displayed in a partial area of the image editing application 1200.

If the user selects a specific area or pixel 1241 in an image 1240 displayed in the partial area of FIG. 12C, a color corresponding to the selected area or pixel 1241 may be extracted.

Figure 12D:
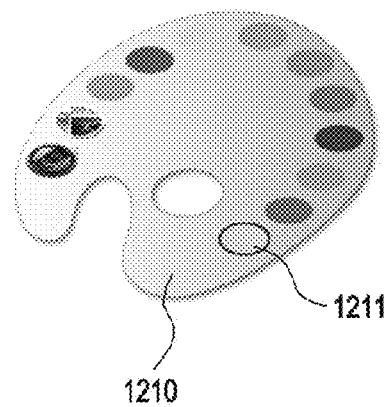

Referring to FIG. 12D, the extracted color may be displayed as a color corresponding to the preset color assignment area 1211 of the palette image 1210.

Figure 13:
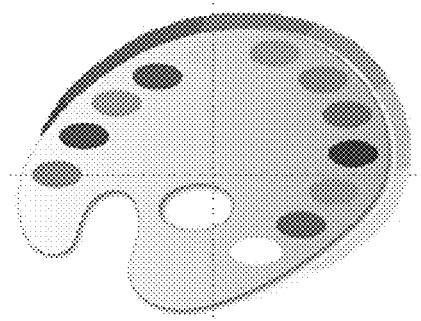
FIG. 13 illustrates areas in an electronic palette according to various embodiments of the present disclosure.

FIG. 13 illustrates areas in an electronic palette according to various embodiments of the present disclosure.

Referring to FIG. 13, a palette image, as described above, may include a plurality of color assignment areas. Further, according to various embodiments of the present disclosure, a saturation spectrum corresponding to a selected color among the plurality of color assignment areas may be displayed in a specific area (e.g., a border area) of the palette image, as described above.

FIGS. 14A to 14F illustrate a method of mixing colors in an electronic palette according to various embodiments of the present disclosure.

Figure 14A:
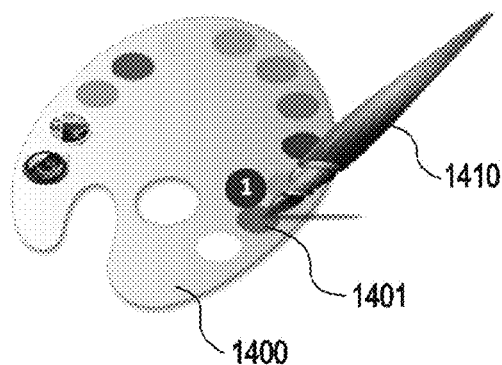
FIGS. 14A to 14F illustrate a method of mixing colors in an electronic palette according to various embodiments of the present disclosure.

Referring to FIG. 14A, the user may select a first color by selecting an area 1401 corresponding to the first color on a palette image 1400, using a pen 1410.

Figure 14B:
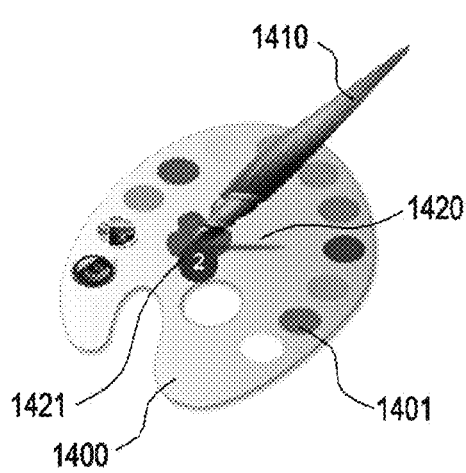

Referring to FIG. 14B, for example, the user may display the selected first color in a color mixing area 1420 (1421) by selecting the color mixing area 1420 using the pen 1410.

Figure 14C:
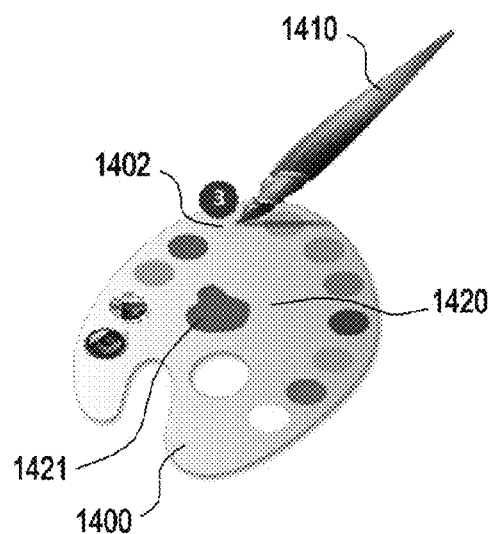

Referring to FIG. 14C, the user may select a second color by selecting an area 1402 corresponding to the second color on the palette image 1400, using the pen 1410.

Figure 14D:
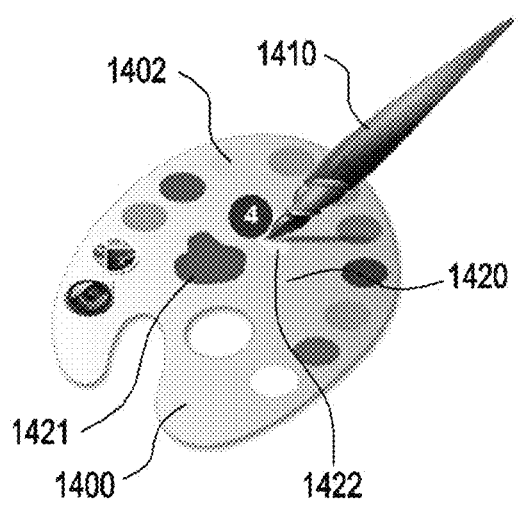

Referring to FIG. 14D, for example, the user may display the selected second color in the color mixing area 1420 (1422) by selecting the color mixing area 1420 using the pen 1410.

Figure 14E:
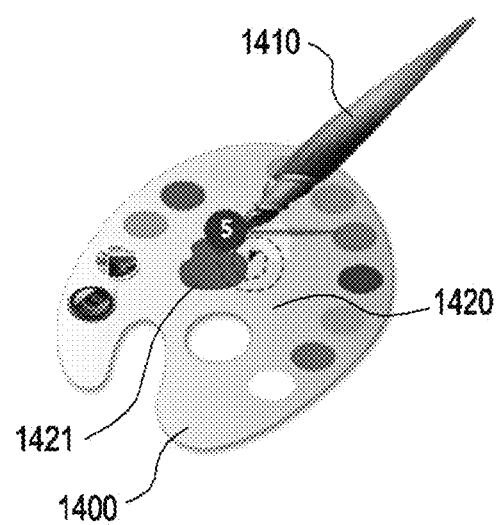

Referring to FIG. 14E, if the user brings the selected first and second colors to the color mixing area 1420 and takes a preset gesture (e.g., a gesture of mixing colors with a brush), a mixed color of the selected colors may be processed to be displayed.

Figure 14F:
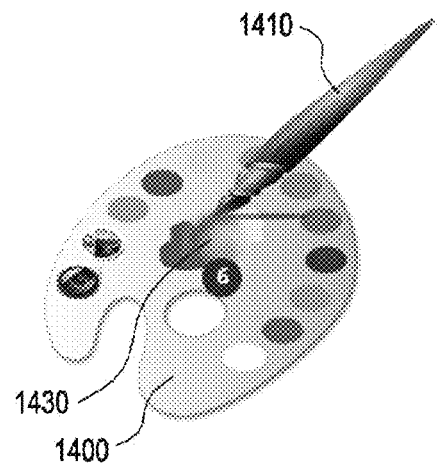

Referring to FIG. 14F, a mixed color 1430 of the selected colors that are mixed depending on an input of a color mixing gesture as in FIG. 14E, may be displayed in the color mixing area.

Figure 15:
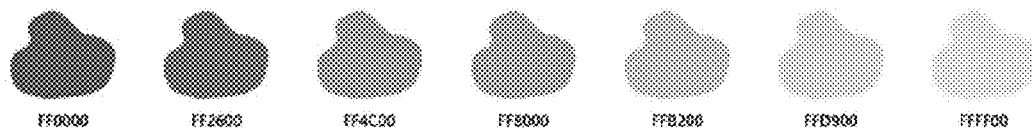
FIG. 15 illustrates step-by-step colors represented during color mixing according to various embodiments of the present disclosure.
Figure 16:
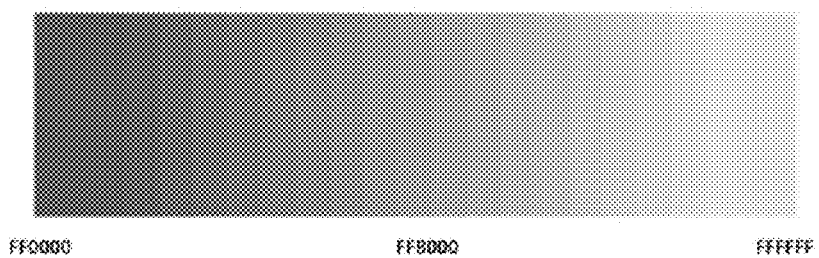
FIG. 16 illustrates step-by-step colors represented during color mixing according to various embodiments of the present disclosure.

FIGS. 15 and 16 illustrate step-by-step colors represented during color mixing according to various embodiments of the present disclosure.

Referring to FIGS. 15 and 16, the representation of a degree at which colors are mixed may be set in a plurality of steps (e.g., 5 basic steps), and the degree may represent each step of the color.

For example, when an RGB value of red is set as FF0000 and an RGB value of yellow is set as FFFF00, a method of dividing the two colors in five steps may be implemented to divide a difference value of each of R, G and B in five steps and show a color of the corresponding value each time the brush is rotated once. For example, since both of the two colors are the same as FF/00 in terms of a value of R/B, there is no change, and if a difference between 00 and FF is divided in five steps in terms of a value of only G, the value may be determined as 26, 4C, 80, B2 and D9.

This may be represented in five colors of FF2600, FF4C00, FF8000, FFB200 and FFD900, and the steps may be adjusted by the user in the future.

Further, according to various embodiments of the present disclosure, for the change of colors, a change in color may be represented step by step each time the brush is rotated. For example, as shown in FIG. 15, the RGB value of red may be implemented to move from FF0000 to FFFF00 and the RGB value of yellow may be implemented to move from FFFF00 to FF0000.

Figure 17:
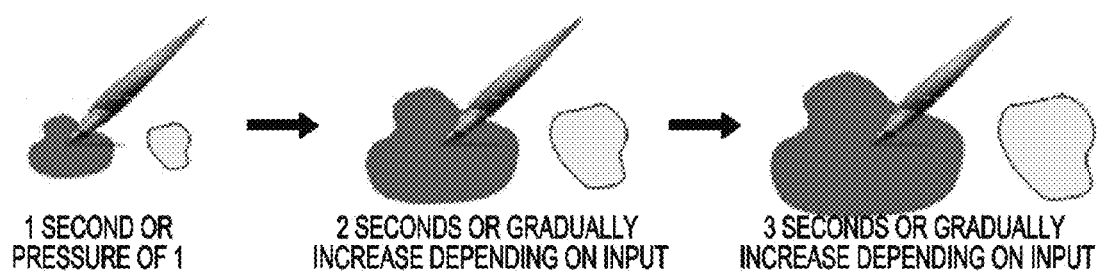
FIG. 17 illustrates an amount of color represented during color mixing according to various embodiments of the present disclosure.
Figure 18:
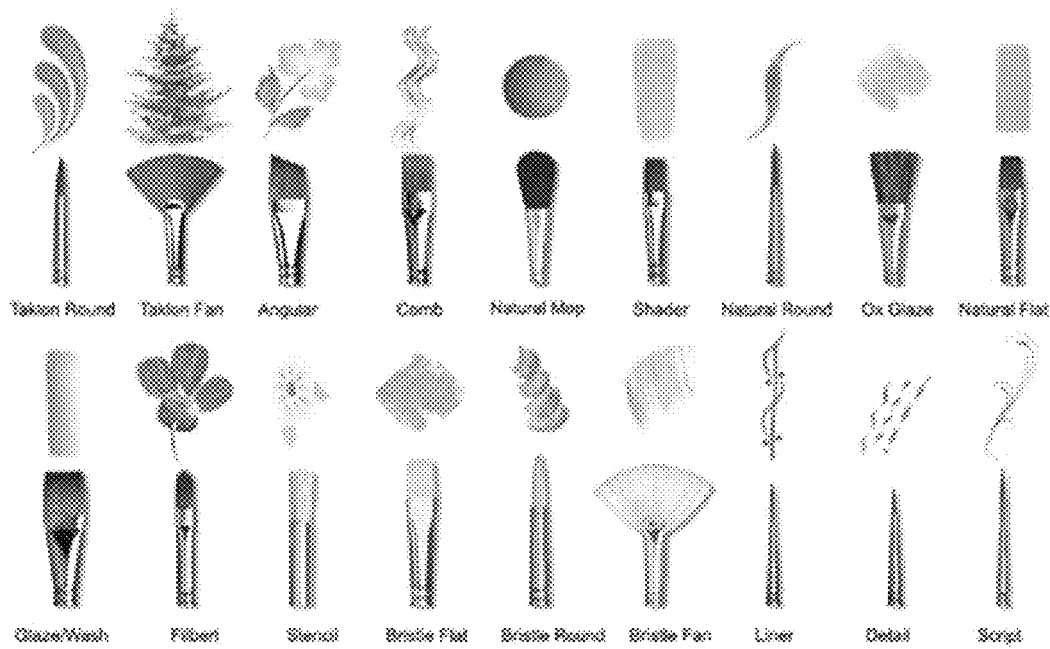
FIG. 18 illustrates tools available during color editing according to various embodiments of the present disclosure.

FIG. 17 illustrates an amount of color represented during color mixing according to various embodiments of the present disclosure. FIG. 18 illustrates tools available during color editing according to various embodiments of the present disclosure.

Referring to FIGS. 17 and 18, in a method of bringing colors in sequence, in a case where the finger is used to adjust the amount of brought colors, the user's touch time may be utilized, and in a case where the pen is used, the pen pressure and the pressure time may be measured and matched to the amount of the selected color.

For example, in a case where the user selects a color 'A' and puts the pen/finger on the palette image, the size of the amount of brought color may be represented in circle depending on the increment of the time and pressure of the finger/pen put on the palette image.

Further, as shown in FIG. 18, by displaying a variety of brush shapes, it is possible to provide the new user experience to the user.

Figure 19:
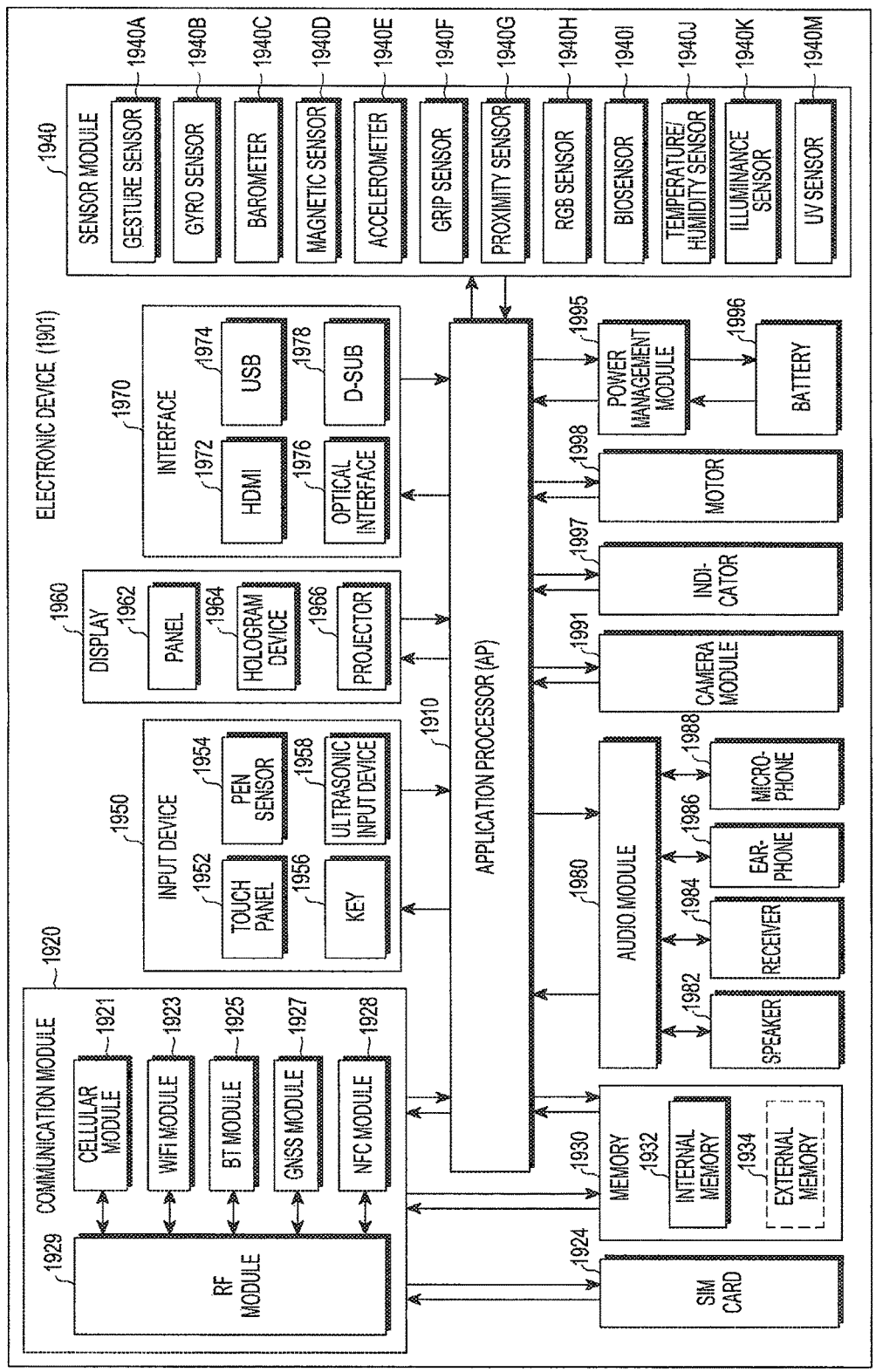
FIG. 19 is a block diagram illustrating a structure of an electronic device according to various embodiments of the present disclosure.

FIG. 19 is a block diagram illustrating a structure of an electronic device according to various embodiments of the present disclosure.

Referring to FIG. 19, an electronic device 1901 may include, for example, the entirety or a part of the electronic device 200 shown in FIG. 2. The electronic device 1901 may include at least one AP 1910, a communication module 1920, a subscriber identification module (SIM) card 1924, a memory 1930, a sensor module 1940, an input device 1950, a display 1960, an interface 1970, an audio module 1980, a camera module 1991, a power management module 1995, a battery 1996, an indicator 1997, and a motor 1998.

The AP 1910 may, for example, control a plurality of hardware or software components connected to the AP 1910 by running the operating system or application program, and may process and compute a variety of data. The AP 1910 may be implemented as, for example, a system on chip (SoC). In an embodiment of the present disclosure, the AP 1910 may further include a graphics processing unit (GPU) and/or an image signal processor. The AP 1910 may include at least some (e.g., a cellular module 1921) of the components shown in FIG. 19. The AP 1910 may load, on a volatile memory, a command or data received from at least one of other components (e.g., a non-volatile memory) and process the loaded data, and may store a variety of data in a non-volatile memory.

The communication module 1920 may include, for example, the cellular module 1921, a wireless fidelity (WiFi) module 1923, a Bluetooth (BT) module 1925, a GPS module 1927, a near field communication (NFC) module 1928, and a radio frequency (RF) module 1929.

The cellular module 1921 may, for example, provide a voice call service, a video call service, a messaging service or an Internet service over a communication network. In an embodiment of the present disclosure, the cellular module 1921 may perform identification and authentication of the electronic device 1901 within the communication network using the SIM card 1924. In an embodiment of the present disclosure, the cellular module 1921 may perform some of the functions that can be provided by the AP 1910. In an embodiment of the present disclosure, the cellular module 1921 may include a CP.

Each of the WiFi module 1923, the BT module 1925, the GPS module 1927 or the NFC module 1928 may include, for example, a processor for processing the data transmitted or received through the corresponding module. In some embodiments of the present disclosure, at least some (e.g., two or more) of the cellular module 1921, WiFi module 1923, the BT module 1925, the GPS module 1927 or the NFC module 1928 may be included in one integrated chip (IC) or IC package.

The RF module 1929 may, for example, transmit and receive communication signals (e.g., RF signals). The RF module 1929 may include, for example, a transceiver, a power amplifier module (PAM), a frequency filter, a low noise amplifier (LNA), or an antenna. In an embodiment of the present disclosure, at least one of the cellular module 1921, the WiFi module 1923, the BT module 1925, the GPS module 1927 or the NFC module 1928 may transmit and receive RF signals through a separate RF module.

The SIM card 1924 may include, for example, a card with a subscriber identification module and/or an embedded SIM. The SIM card 1924 may include unique identification information (e.g., integrated circuit card identifier (ICCID)) or subscriber information (e.g., international mobile subscriber identity (IMSI)).

The memory 1930 (e.g., the memory 130) may include, for example, an internal memory 1932 or an external memory 1934. The internal memory 1932 may include at least one of, for example, a volatile memory (e.g., dynamic RAM (DRAM), static RAM (SRAM), synchronous dynamic RAM (SDRAM), and the like) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash, and the like), hard drive, or solid state drive (SSD)).

The external memory 1934 may further include a flash drive, for example, compact flash (CF), secure digital (SD), micro SD, mini SD, extreme digital (xD), a multi-media card (MMC), a memory stick, and the like. The external memory 1934 may be functionally and/or physically connected to the electronic device 1901 through various interfaces.

The sensor module 1940 may, for example, measure the physical quantity or detect the operating status of the electronic device 1901, and convert the measured or detected information into an electrical signal. The sensor module 1940 may include at least one of, for example, a gesture sensor 1940A, a gyro sensor 1940B, a barometer 1940C, a magnetic sensor 1940D, an accelerometer 1940E, a grip sensor 1940F, a proximity sensor 1940G, a color sensor (e.g., red-green-blue (RGB) sensor) 1940H, a biosensor 1940I, a temperature/humidity sensor 1940J, an illuminance sensor 1940K, or a ultra violet (UV) sensor 1940M. Additionally or alternatively, the sensor module 1940 may include, for example, an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 1940 may further include a control circuit for controlling at least one or more sensors belonging thereto. In some embodiments of the present disclosure, the electronic device 1901 may further include a processor configured to control the sensor module 1940, independently of or as a part of the AP 1910, thereby to control the sensor module 1940 while the AP 1910 is in a sleep state.

The input device 1950 may include, for example, a touch panel 1952, a (digital) pen sensor 1954, a key 1956, or an ultrasonic input device 1958. The touch panel 1952 may use at least one of, for example, the capacitive, resistive, infrared or ultrasonic scheme. The touch panel 1952 may further include a control circuit. The touch panel 1952 may further include a tactile layer, to provide a tactile or haptic feedback to the user.

The (digital) pen sensor 1954, for example, may be a part of the touch panel 1952, or may include a separate recognition sheet. The key 1956 may include, for example, a physical button, an optical key or a keypad. The ultrasonic input device 1958 may detect ultrasonic waves with a microphone (e.g., a microphone 1988) in the electronic device 1901, using an input tool for generating an ultrasonic signal, to identify the data corresponding to the detected ultrasonic waves.

The display 1960 (e.g., the display 160) may include a panel 1962, a hologram device 1964, or a projector 1966. The panel 1962 may be implemented to be, for example, flexible, transparent or wearable. The panel 1962, together with the touch panel 1952, may be configured as one module. The hologram device 1964 may show stereoscopic images in the air using the interference of the light. The projector 1966 may display images by projecting the light on the screen. The screen may, for example, be disposed on the inside or outside of the electronic device 1901. In an embodiment of the present disclosure, the display 1960 may further include a control circuit for controlling the panel 1962, the hologram device 1964, or the projector 1966.

The interface 1970 may include, for example, an HDMI 1972, a USB 1974, an optical interface 1976 or D-subminiature (D-sub) 1978. Additionally or alternatively, the interface 1970 may include, for example, a mobile high-definition link (MHL) interface, an SD card/multi-media card (MMC) interface or an infrared data association (IrDA) interface.

The audio module 1980 may, for example, convert the sounds and the electrical signals bi-directionally. The audio module 1980 may, for example, process the sound information that is received or output through a speaker 1982, a receiver 1984, an earphone 1986 or the microphone 1988.

The camera module 1991 is, for example, a device capable of capturing still images and videos. In an embodiment of the present disclosure, the camera module 1991 may include one or more image sensors (e.g., a front image sensor or a rear image sensor), a lens, an image signal processor (ISP), or a flash (e.g., an LED or xenon lamp).

The power management module 1995 may, for example, manage the power of the electronic device 1901. In an embodiment of the present disclosure, the power management module 1995 may include, for example, a power management integrated circuit (PMIC), a charger integrated circuit (IC), or a battery or fuel gauge. The PMIC may have the wired and/or wireless charging schemes. The wireless charging scheme may include, for example, a magnetic resonance scheme, a magnetic induction scheme, or an electromagnetic scheme, and the power management module 1995 may further include additional circuits (e.g., a coil loop, a resonant circuit, a rectifier, and the like) for wireless charging. The battery or fuel gauge may, for example, measure the remaining capacity, charging voltage, charging current or temperature of the battery 1996. The battery 1996 may include, for example, a rechargeable battery and/or a solar battery.

The indicator 1997 may indicate specific status (e.g., boot status, message status, charging status, and the like) of the electronic device 1901 or a part (e.g., the AP 1910) thereof. The motor 1998 may convert an electrical signal into mechanical vibrations, thereby causing the vibration or haptic effect. Although not shown, the electronic device 1901 may include a processing device (e.g., a GPU) for mobile TV support. The processing device for mobile TV support may, for example, process the media data that is based on the standards, such as digital multimedia broadcasting (DMB), digital video broadcasting (DVB) or Media-FLO™.

Each of the above-described components of the electronic device may be configured with one or more components, names of which may vary depending on the type of the electronic device. In various embodiments of the present disclosure, the electronic device may include at least one of the above-described components, some of which may be omitted, or may further include additional other components. Further, some of the components of the electronic device according to various embodiments of the present disclosure may be configured as one entity by being combined, thereby performing the previous functions of the components in the same manner.

Figure 20:
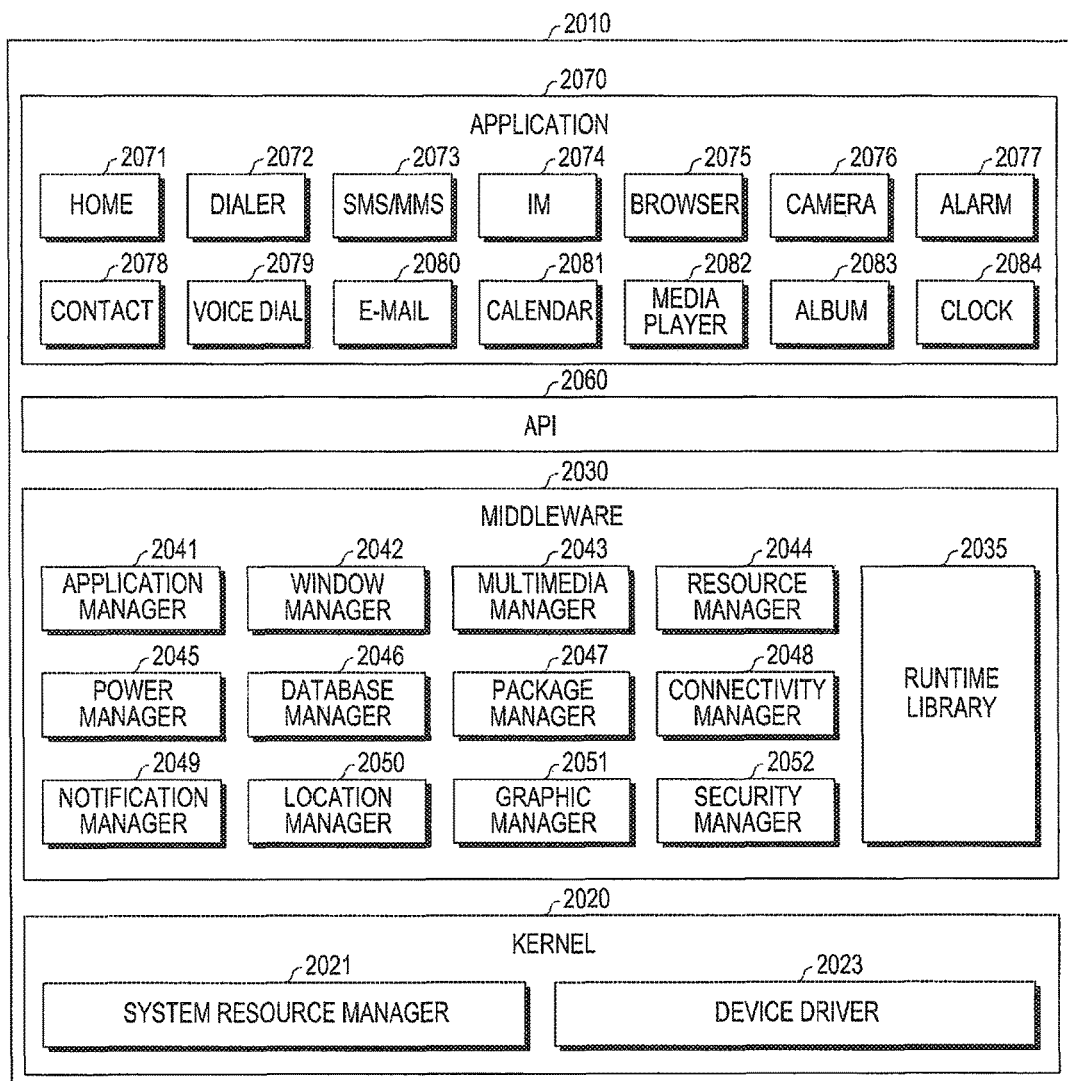
FIG. 20 is a block diagram of a program module according to various embodiments of the present disclosure.

FIG. 20 is a block diagram of a program module according to various embodiments of the present disclosure.

Referring to FIG. 20, in an embodiment of the present disclosure, a program module 2010 (e.g., the program 140) may include an OS for controlling the resources related to the electronic device, and/or a variety of applications (e.g., the application program 147) that run on the operating system. The operating system may be, for example, Android™, iOS™, Windows™, Symbian™, Tizen™, Bada™, and the like.

The program module 2010 may include a kernel 2020, a middleware 2030, an API 2060, and/or an application(s) 2070. At least a part of the program module 2010 may be preloaded on the electronic device, or downloaded from the server.

The kernel 2020 may include, for example, a system resource manager 2021 or a device driver 2023. The system resource manager 2021 may control, allocate or recover the system resources. In an embodiment of the present disclosure, the system resource manager 2021 may include a process manager, a memory manager, a file system manager, and the like. The device driver 2023 may include, for example, a display driver, a camera driver, a Bluetooth driver, a shared memory driver, a USB driver, a keypad driver, a WiFi driver, an audio driver, or an inter-process communication (IPC) driver.

The middleware 2030, for example, may provide a function that is required in common by the application(s) 2070, or may provide various functions to the application 2070 through the API 2060 so that the application 2070 may efficiently use the limited system resources within the electronic device. In an embodiment of the present disclosure, the middleware 2030 may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, or a security manager 2052.

The runtime library 2035 may include, for example, a library module that a compiler uses to add a new function through a programming language while the application 2070 is run. The runtime library 2035 may perform an I/O management function, a memory management function, an arithmetic function, and the like.

The application manager 2041 may, for example, manage the life cycle of at least one of the application(s) 2070. The window manager 2042 may manage graphic user interface (GUI) resources that are used on the screen. The multimedia manager 2043 may determine the format required for playback of various media files, and encode or decode the media files using a codec for the format. The resource manager 2044 may manage resources, such as a source code, a memory or a storage space for any one of the application(s) 2070.

The power manager 2045 may, for example, manage the battery or power by operating with the basic input/output system (BIOS), and provide power information required for an operation of the electronic device. The database manager 2046 may create, search or update the database that is to be used by at least one of the application(s) 2070. The package manager 2047 may manage installation or update of applications that are distributed in the form of a package file.

The connectivity manager 2048 may, for example, manage wireless connection, such as WiFi or Bluetooth. The notification manager 2049 may indicate or notify events, such as message arrival, appointments and proximity in a manner that doesn't interfere with the user. The location manager 2050 may manage the location information of the electronic device. The graphic manager 2051 may manage the graphic effect to be provided to the user, or the user interface related thereto. The security manager 2052 may provide various security functions required for the system security or user authentication. In an embodiment of the present disclosure, if the electronic device (e.g., the electronic device in FIG. 19) includes a phone function, the middleware 2030 may further include a telephony manager for managing the voice or video call function of the electronic device.

The middleware 2030 may include a middleware module that forms a combination of various functions of the above-described components. The middleware 2030 may provide a module specialized for the type of the operating system in order to provide a differentiated function. Further, the middleware 2030 may dynamically remove some of the existing components, or add new components.

The API 2060, for example, is a set of API programming functions, and may be provided in a different configuration depending on the operating system. For example, for Android™ or iOS™, the API 2060 may provide one API set per platform, and for Tizen™, the API 2060 may provide two or more API sets per platform.

The application 2070 may include, for example, one or more applications capable of providing functions, such as a home application 2071, a dialer application 2072, a short message service/multimedia messaging service (SMS/MMS) application 2073, an instant message (IM) application 2074, a browser application 2075, a camera application 2076, an alarm application 2077, a contact application 2078, a voice dial application 2079, an email application 2080, a calendar application 2081, a media player application 2082, an album application 2083, a clock application 2084, a healthcare application (e.g., for measuring the quantity of exercise, the blood glucose, and the like), or environmental information provision (e.g., for providing information about the atmospheric pressure, the humidity, the temperature, and the like).

In an embodiment of the present disclosure, the application 2070 may include an application (hereinafter, referred to as an 'information exchange application' for convenience of description) for supporting information exchange between the electronic device (e.g., the electronic device in FIG. 1 or 2) and external electronic devices. The information exchange application may include, for example, a notification relay application for delivering specific information to the external electronic devices, or a device management application for managing the external electronic devices.

For example, the notification relay application may include a function of delivering notification information generated in other applications (e.g., an SMS/MMS application, an email application, a healthcare application, an environmental information application, and the like) of the electronic device, to the external electronic devices. Further, the notification relay application may, for example, receive notification information from an external electronic device, and provide the received notification information to the user.

The device management application may, for example, manage at least one function (e.g., a function of adjusting the turn-on/off of the external electronic device itself (or some components thereof) or the brightness (or the resolution) of the display) of the external electronic device communicating with the electronic device, and may manage (e.g., install, delete or update) an application operating in the external electronic device or a service (e.g., a call service or a messaging service) provided in the external electronic device.

In an embodiment of the present disclosure, the application 2070 may include an application (e.g., a healthcare application) that is specified depending on the properties (e.g., the type of the electronic device is a mobile medical device) of the external electronic device. In an embodiment of the present disclosure, the application 2070 may include an application received or downloaded from the external electronic device. In an embodiment of the present disclosure, the application 2070 may include a preloaded application or a third party application that can be downloaded from the server. The names of the components of the illustrated program module 2010 may vary depending on the type of the operating system.

In various embodiments of the present disclosure, at least a part of the program module 2010 may be implemented by software, firmware, hardware or a combination thereof. At least a part of the program module 2010 may, for example, be implemented (e.g., executed) by a processor (e.g., the AP 1910). At least a part of the program module 2010 may include, for example, a module, a program, a routine, an instruction set or a process, for performing one or more functions.

The term 'module' or 'function' as used herein may, for example, refer to a unit that includes one or a combination of hardware, software or firmware. The term 'module' or 'function' may, for example, be interchangeably used with terms, such as unit, logic, logical block, component, or circuit. The 'module' or 'function' may be the minimum unit of an integrally constructed part, or a part thereof. The 'module' or 'function' may be the minimum unit for performing one or more functions, or a part thereof. The 'module' or 'function' may be implemented mechanically or electronically. For example, the 'module' or 'function' may include at least one of an application-specific integrated circuit (ASIC) chip, field-programmable gate arrays (FPGAs), or a programmable-logic device, which are known or will be developed in the future, and which perform certain operations.

At least a part of the apparatus (e.g., modules or functions thereof) or method (e.g., operations) according to various embodiments of the present disclosure may, for example, be implemented by a command that is stored in computer-readable storage media in the form of a program module. In a case where the command is executed by one or more processors (e.g., the processor 120), the one or more processors may perform a function corresponding to the command. The computer-readable storage media may be, for example, the storage 240.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a program module according to various embodiments of the present disclosure may include at least one of the above-described components, some of which may be omitted, or may further include additional other components. Operations performed by a module, a program module or other components according to various embodiments of the present disclosure may be performed in a sequential, parallel, iterative or heuristic way. Some operations may be performed in a different order or omitted, or other operations may be added.

According to various embodiments of the present disclosure, in the storage media storing commands, when the commands are executed by at least one processor, the commands may be set to allow the at least one processor to perform at least one operation. The at least one operation may include an operation of displaying an image editing tool including a plurality of color assignment areas on a screen of the electronic device, an operation of running a preset application installed in the electronic device in response to an input related to color extraction, an operation of storing information about a color selected in at least one area of an execution screen of the application, and an operation of displaying the selected color in a color assignment area of the image editing tool.

Further, according to various embodiments of the present disclosure, in the storage media storing commands, when the commands are executed by at least one processor, the commands may be set to allow the at least one processor to perform at least one operation. The at least one operation may include an operation of displaying an image editing tool including a plurality of color assignment areas and a color mixing area on a screen of the electronic device, an operation of selecting a first color assigned to a first color assignment area and a second color assigned to a second color assignment area among the plurality of color assignment areas of the image editing tool, and an operation of displaying a third color generated by mixing the selected first and second colors in the color mixing area of the image editing tool depending on an input of a user gesture corresponding to color mixing.

The embodiments disclosed herein have been presented for description and understanding of the disclosed technical details, but it is not intended to limit the scope of the present disclosure. Therefore, the scope of the present disclosure should be construed to include all modifications or various other embodiments based on the spirit of the present disclosure.

As is apparent from the foregoing description, an electronic device and a method for editing images in the electronic device according to various embodiments of the present disclosure may provide a method capable of allowing the user of the electronic device to readily extract and mix colors using various forms of user input, such as a touch, thereby to provide a new emotional experience and an easy-to-use user interface.

Further, an electronic device and a method for editing images in the electronic device according to various embodiments of the present disclosure may provide various user interfaces capable of facilitating the image editing by readily extracting a color through a specific image or object when editing images in the electronic device.

An aspect of various embodiments of the present disclosure may provide a user interface capable of expressing the analog sensibility, such as brush, pencil, paper or palette, using the pen, the finger and the image that is displayed on the screen of the electronic device. If there is a color that the user wants or desires to extract on the user interface, the user may bring the color to the image editing tool (e.g., an image in the form of a palette) that is displayed on the electronic device in association with a preset application (e.g., a camera application or a Gallery application).

Further, it is possible to provide a new user experience that the user has never felt before, by allowing the user to select and mix various desired colors in an analog way on the image editing tool in the form of a palette, which is displayed on the electronic device, as if the user makes a new color by combining several colors on the palette.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a storage configured to store information about a plurality of color assignment areas included in an image editing tool displayed on a screen of the electronic device;
   a display; and
   a controller configured to:
      display, on the display, the image editing tool including the plurality of color assignment areas;
      run an image editing application and display a first screen according to execution of the image editing application including the image editing tool on a first region of the display,
      run a first application installed in the electronic device in response to a first input related to color extraction and display a second screen according to execution of the first application on a second region of the display,
      control the display to display a color selected in the second screen in a preset area from among the plurality of color assignment areas included in the first screen,
      in response to a second input for running a second application, run the second application installed in the electronic device and display a third screen according to execution of the second application with image editing tool including the color selected in the second screen, and
      in response to a third input for applying the color selected in the second screen to the third screen, display a fourth screen generated by applying the color selected in the second screen to the third screen,
   wherein the first application comprises at least one of a camera-related application or a Gallery application capable of reading a plurality of images stored in the electronic device, and
   wherein the first input related to color extraction includes a touch input for selecting an icon corresponding to the first application, and wherein the icon is included in the first screen.

2. The electronic device of claim 1, wherein the image editing tool is displayed in the form of a palette.

3. The electronic device of claim 1, wherein the selected color comprises a color corresponding to a selected area or pixel of an image that is captured by a camera depending on execution of the camera-related application.

4. The electronic device of claim 1, wherein the selected color comprises a color corresponding to a selected area or pixel of a preview image that is captured by a camera depending on execution of the camera-related application.

5. The electronic device of claim 1, wherein the selected color comprises a color corresponding to an area or pixel selected in at least one image that is displayed on the second screen depending on execution of the Gallery application.

6. A method for editing an image in an electronic device, the method comprising:
   running an image editing application;
   displaying a first screen according to execution of the image editing application including an image editing tool including a plurality of color assignment areas on a first region of the electronic device;
   running a first application installed in the electronic device in response to a first input related to color extraction;
   displaying a second screen according to execution of the first application on a second region of the electronic device;
   in response to a selection of a color in the second screen, displaying the selected color in a preset area from among the plurality of color assignment areas included in the first screen,
   in response to a second input for running a second application, running the second application installed in the electronic device, and displaying a third screen according to execution of the second application with image editing tool including the color selected in the second screen; and
   in response to a third input for applying the color selected in the second screen to the third screen, displaying a fourth screen generated by applying the color selected in the second screen to the third screen,
   wherein the first application comprises at least one of a camera-related application or a Gallery application capable of reading a plurality of images stored in the electronic device, and
   wherein the first input related to color extraction includes a touch input for selecting an icon corresponding to the first application, and wherein the icon is included in the first screen.

7. The method of claim 6, wherein the image editing tool is displayed in the form of a palette.

8. The method of claim 6, wherein the selected color comprises a color corresponding to a selected area or pixel of an image that is captured by a camera depending on execution of the camera-related application.

9. The method of claim 6, wherein the selected color comprises a color corresponding to a selected area or pixel of a preview image that is captured by a camera depending on execution of the camera-related application.

10. The method of claim 6, wherein the selected color comprises a color corresponding to an area or pixel selected in at least one image that is displayed on the second screen depending on execution of the Gallery application.

* * * * *